May 26, 1936.　　　F. L. FULLER　　　2,041,752
CASH REGISTER
Filed Jan. 18, 1927　　16 Sheets-Sheet 6

INVENTOR
Frederick L. Fuller
BY
ATTORNEYS

May 26, 1936.  F. L. FULLER  2,041,752
CASH REGISTER
Filed Jan. 18, 1927  16 Sheets-Sheet 10
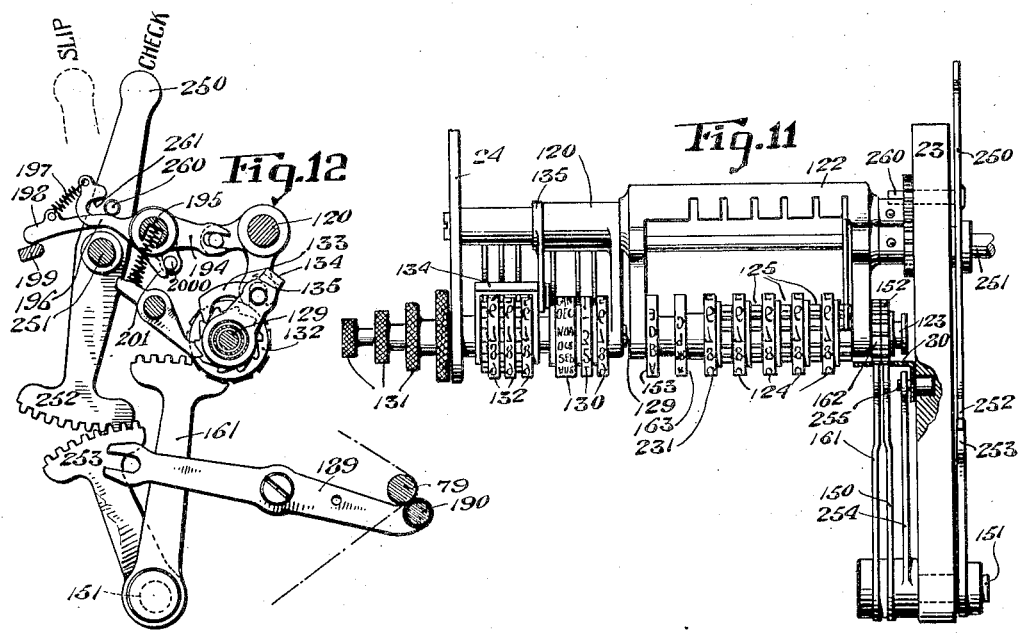
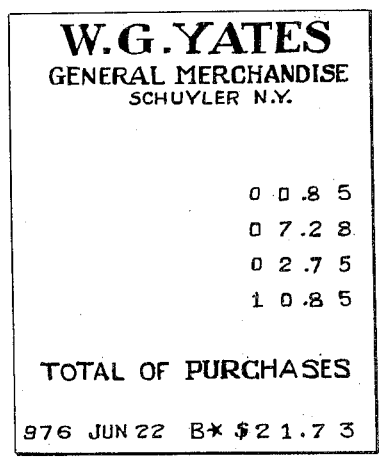
Fig.13
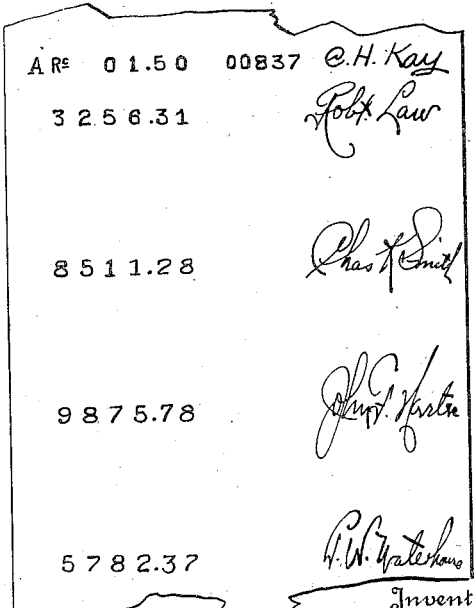
Fig.14  Inventor
Frederick L. Fuller
By
Attorneys Inventor
Frederick L. Fuller Attorneys May 26, 1936.  F. L. FULLER  2,041,752
CASH REGISTER
Filed Jan. 18, 1927   16 Sheets-Sheet 12
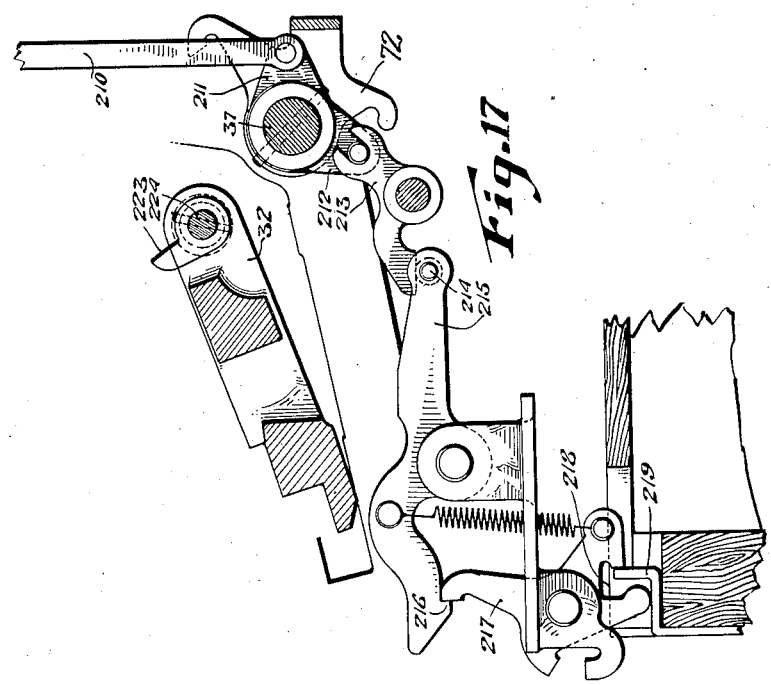
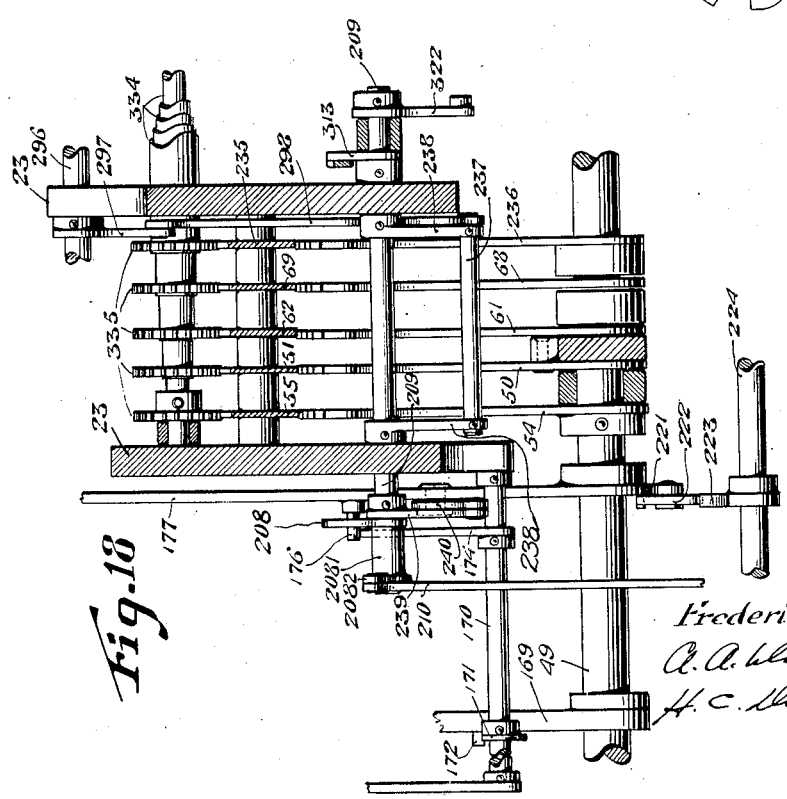

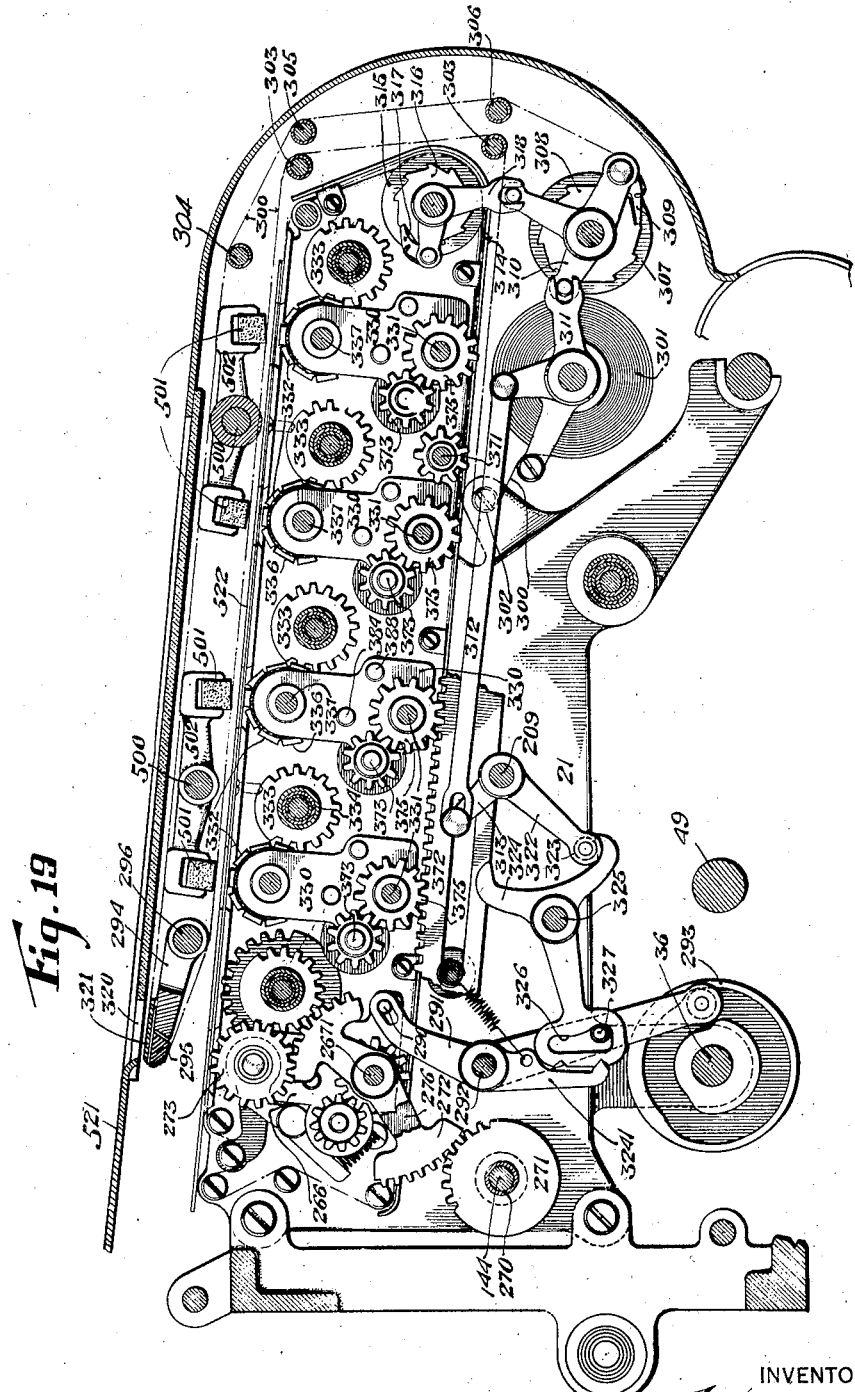

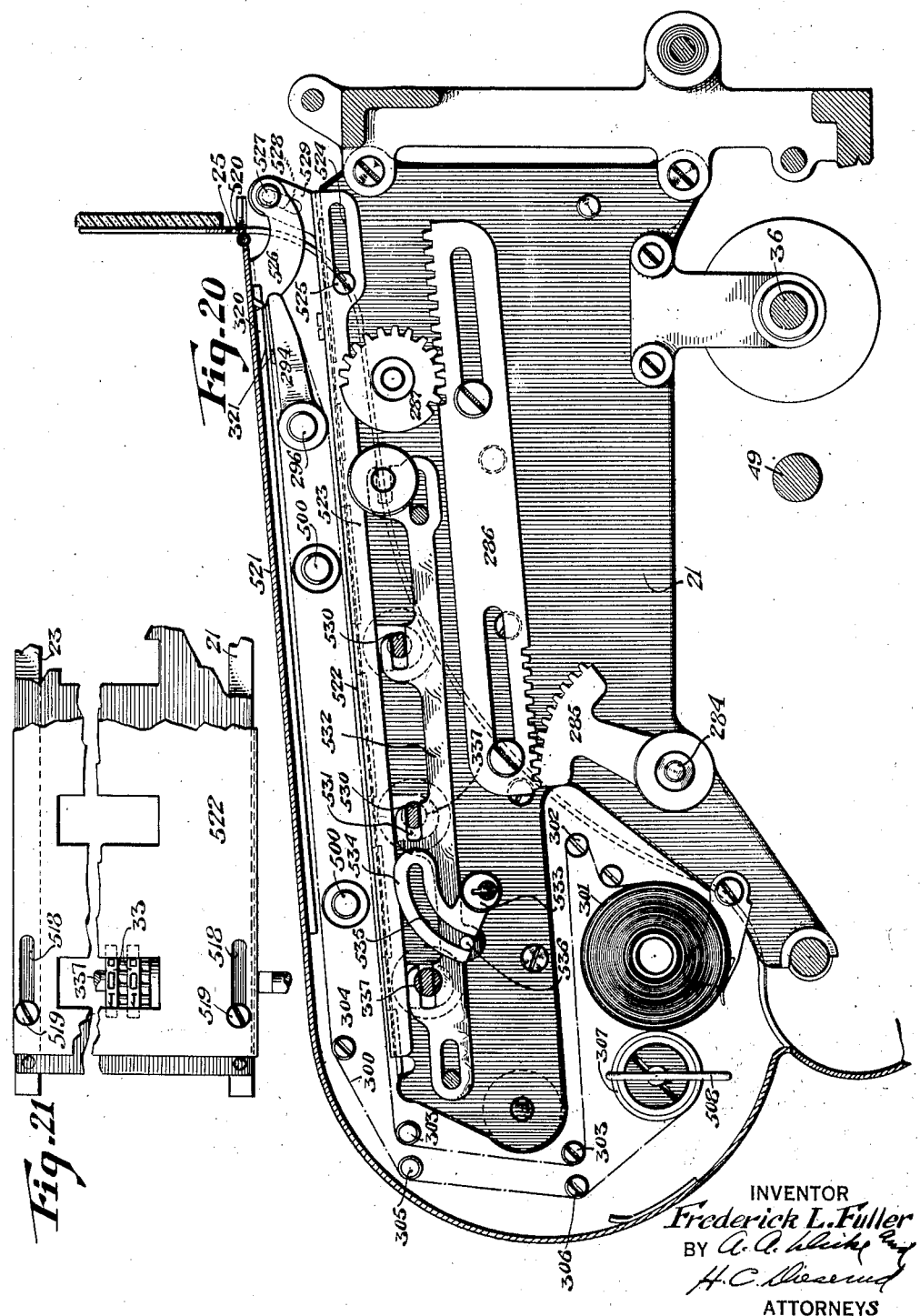

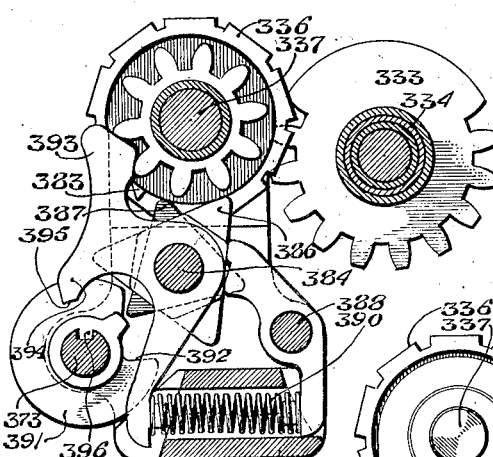
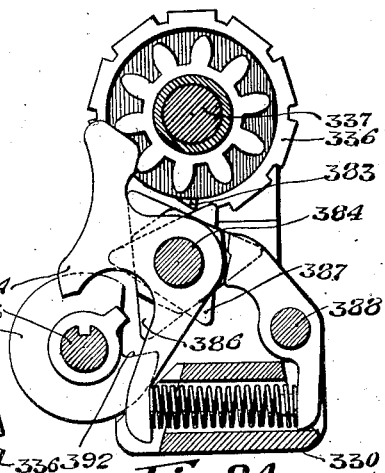
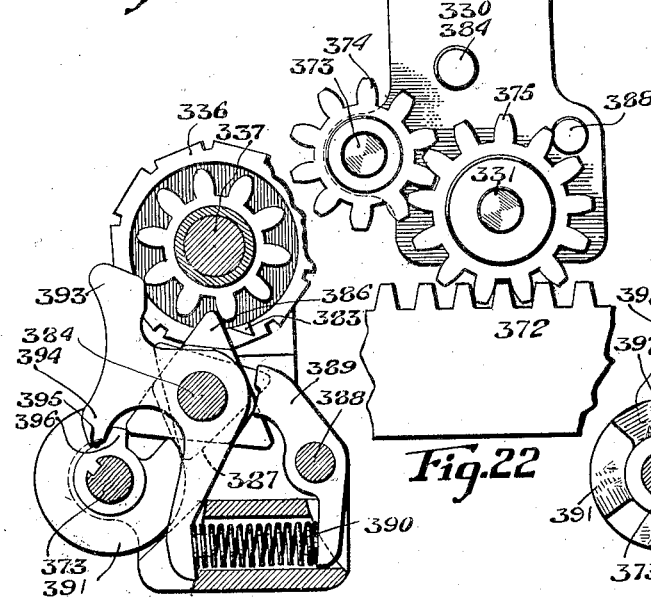
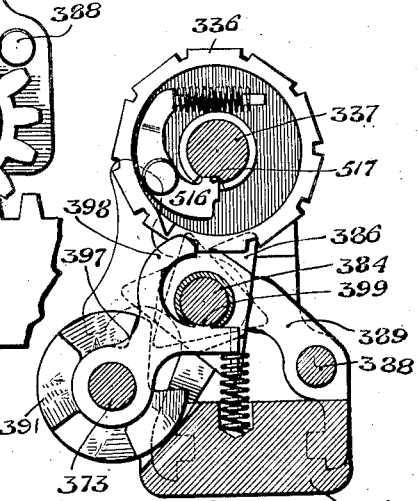
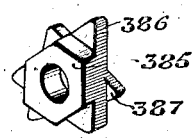
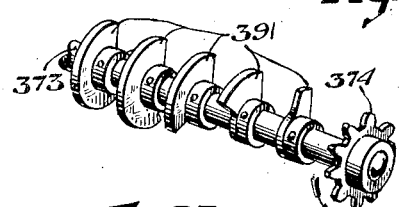

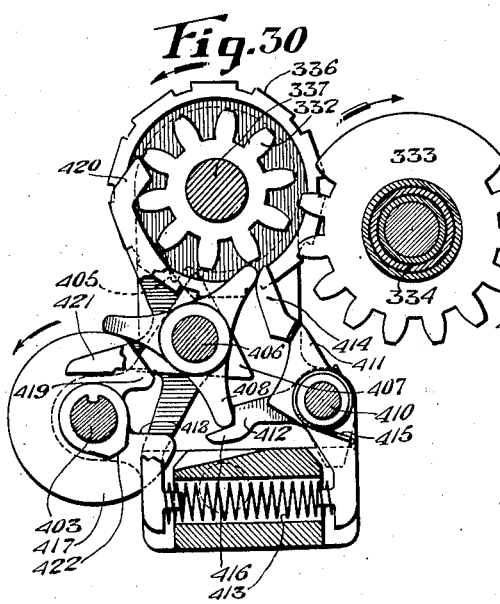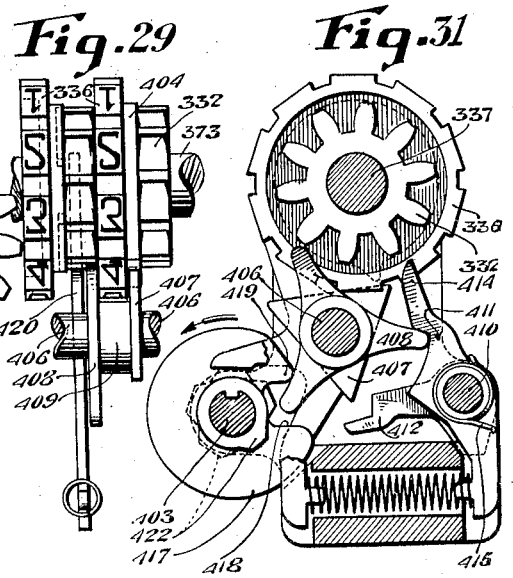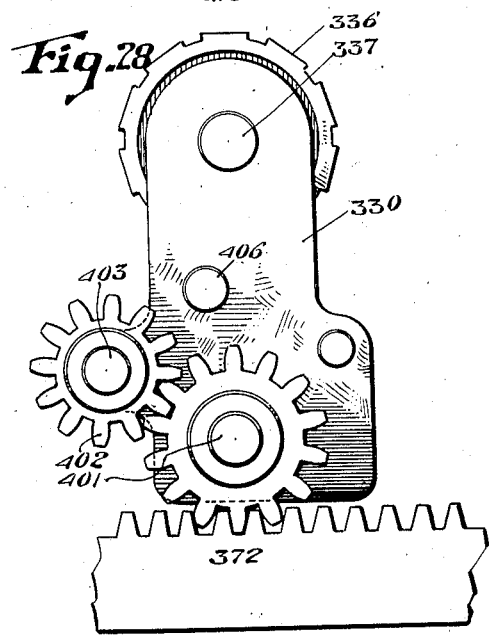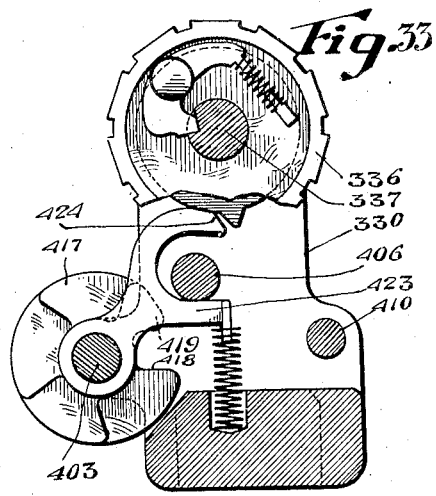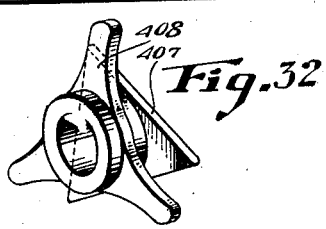

Patented May 26, 1936

2,041,752

UNITED STATES PATENT OFFICE 2,041,752

CASH REGISTER

Frederick L. Fuller, Ilion, N. Y., assignor, by mesne assignments, to The National Cash Register Company, Dayton, Ohio, a corporation of Maryland Application January 18, 1927, Serial No. 161,751

39 Claims. (Cl. 235—3)

This invention relates to cash registers and particularly to that type which in addition to making a record of the transactions in a totalizer, makes a printed record of the items and the totals of the items upon various record mediums.

Cash registers are now upon the market which are adapted to register, print, and indicate the amounts of the successive transactions so that the total of the sales and other related information may be obtained. In some classes of business it is desirable to segregate each transaction into the individual items comprising the transaction so that there will be printed not only the total involved in the transaction, but the individual items as well. With such information upon a slip or issued check the operator may readily check back to ascertain whether or not the articles were properly charged and since the addition of the items is mechanically performed, it will eliminate entirely the danger of incorrectly adding the individual items which is an inherent difficulty in systems in which mental addition is employed.

The principal object of this invention is to provide a cash register with an improved mechanism for recording items and the total of the items either upon an issued check or inserted slip and for simultaneously recording the total on a record strip.

A further object is to provide mechanism whereby the items may be entered in the totalizing devices by merely depressing the operating keys and to provide a separate operating means to record the amounts shown on the totalizer, the recording of which is controlled by the position of the elements of the totalizer.

A still further object is to provide an improved means under control of a separate operating means whereby the sub-totalizer elements which add up the items of each transaction, will be restored to zero prior to the accumulation of items comprising a subsequent sale or transaction.

More specifically it is an object of the present invention to provide means for printing the items entered in the machine upon a suitable record material which, in the illustrated embodiment comprises either an inserted slip or a check strip which is issued from the machine when a suitable manipulative means is operated, the same manipulative means serving to effect the recording of the tool of the items accumulated upon either form of record material and subsequently restoring the totalizer to zero.

In some classes of transactions it is desirable to print the items and the totals upon an inserted slip in lieu of a check and to accomplish this it is an object of the present invention to provide a suitable controlling device whereby the machine may be prepared for itemized printing and totaling upon either an inserted slip or issued check.

In the present preferred embodiment the printing mechanism includes devices for printing the consecutive number upon the checks. Changing the printing mechanism to a sales slip printing condition will prevent actuation of or printing from the consecutive number devices. The provision of a suitable mechanism for so controlling the actuation of the consecutive numbering devices together with their printing action upon the sales slip is still another object of the present invention.

It is also a further object to provide a means whereby the total of the items may be printed upon a record strip contained within the machine together with auxiliary devices whereby stock numbers or other identifying characters may be printed upon the record strip as well as to provide means permitting more extended entries in the form of written notations to be made upon the record strip adjacent the printed items.

It is also an object of the present invention to provide a plurality of totalizers which in the illustrative machine are intended to segregate the sales transacted by the various clerks, the totalizer selecting means being of such a construction that it is only necessary to operate a clerk's key once during a series of item entering operations comprising a transaction to be entered. Suitable totalizer controlling devices are also provided whereby when certain transaction keys are operated the selected totalizer will be disabled so that the items entered will only be entered on the sub-totalizers.

In connection with the clerk's and transaction keys it is also an object to provide a suitable set-up device for corresponding type carriers so that special characters may be printed upon the different record materials to denote which keys have been operated.

It is a still further object of the machine to provide an improved totalizer, the characteristic feature being that the printing totalizer elements and transfer devices are self-contained and are carried by their associated totalizer frames. This permits their ready detachment from the machine for purposes of inspection and repair.

In connection with the totalizing devices it is also an object to provide devices whereby even though the cover which conceals the totalizers is elevated the totalizer elements will be protected against improper manipulation.

It is also an object of the invention to provide a simple and effective total printing mechanism whereby the totals standing upon the departmental totalizers may readily be printed upon the record strip.

Another object is to provide suitable controlling and interlocking devices to insure operation of various features in correct relation to the operation of other features.

In the accompanying drawings the improvements are shown applied to a machine of the same general type as is shown and described in the U. S. application Ser. No. 263,125 filed November 19, 1918 by Frederick L. Fuller, which issued into Patent No. 1,742,701, January 7, 1930, and the British Patents Nos. 135,465; 140,363; 157,823; 157,824 and 157,825 of July 11, 1921, illustrating the same invention. As will be more clearly apparent later on, however, the improvements are capable of being applied to or embodied in a number of other forms of cash registers and accounting machines without departing from the spirit of the invention and since the mechanism devised for effecting the various results as described heretofore is capable of being used for other purposes, either as a whole or in part, the statement of the objects is not intended as a limitation in this respect.

With the above and other objects in view the invention consists in the novel combination of parts, the features of novelty of which are pointed out in the appended claims and a preferred form of embodiment of which is shown in the accompanying drawings:

Of said drawings:

Fig. 7A is a detail of one of the totalizer engaging cams.

Fig. 11 is a view in front elevation of a number of elements comprising part of the improved printing mechanism for printing on checks or slips.

Fig. 12 is a sectional view showing the details of the consecutive numbering device, its operating connections and the lever for disabling the consecutive numbering operating devices at will.

Fig. 13 is an example of one of the checks printed and issued by the machine.

Fig. 14 shows an example of printing upon the record strip.

Fig. 17 is a detail view in side elevation showing the drawer latch and the means for releasing the cash drawer when the sub-total lever is manipulated.

Fig. 18 is a sectional view taken through the totalizer operating racks and associated adjusting segments showing the relation between the adjusting segments and the frame which regulates their movements in both directions during totalizer resetting operations.

Fig. 19 is a transverse sectional view of the machine taken near the right end of the totalizer devices showing the arrangement of the totalizer devices and the associated total printing mechanism. This view also shows the sub-totalizer engaging and disengaging devices for one of the plurality of sub-totalizers with which the machine is equipped.

Fig. 20 is a transverse sectional view as seen toward the left of the machine taken near the right end of the machine showing the adjusting devices for the ledger type carriers, resetting devices therefor, and means for locking them against improper operation.

Fig. 21 is a top plan view of the accounting devices showing their relation with the shield which prevents improper rotation of the totalizer elements when the cabinet cover is elevated.

Fig. 22 is an end view of one of the totalizing devices showing the transfer operating rack and its connection to the transfer operating shaft.

Figs. 23, 24 and 25, are sectional views through one of the totalizers showing particularly the transfer devices and the position that the various parts assume during a transferring operation.

Fig. 26 shows the zero stop device for the highest order totalizer wheel.

Fig. 27 is a perspective view of one of the transfer members.

Fig. 27A is a perspective view of a series of the transfer operating discs.

Fig. 28 is an end view of a modification of one of the totalizing devices.

Fig. 29 is a front view of some of the elements comprising the transfer devices of the modified form.

Figs. 30 and 31 are sectional views through one of the totalizers showing particularly the modified transfer devices and the position the various parts assume during a transferring operation.

Fig. 32 is a perspective of one of the transfer members for the modified transfer devices.

Fig. 33 shows the zero stop for the highest order wheel of the modified totalizer.

Figure 1:
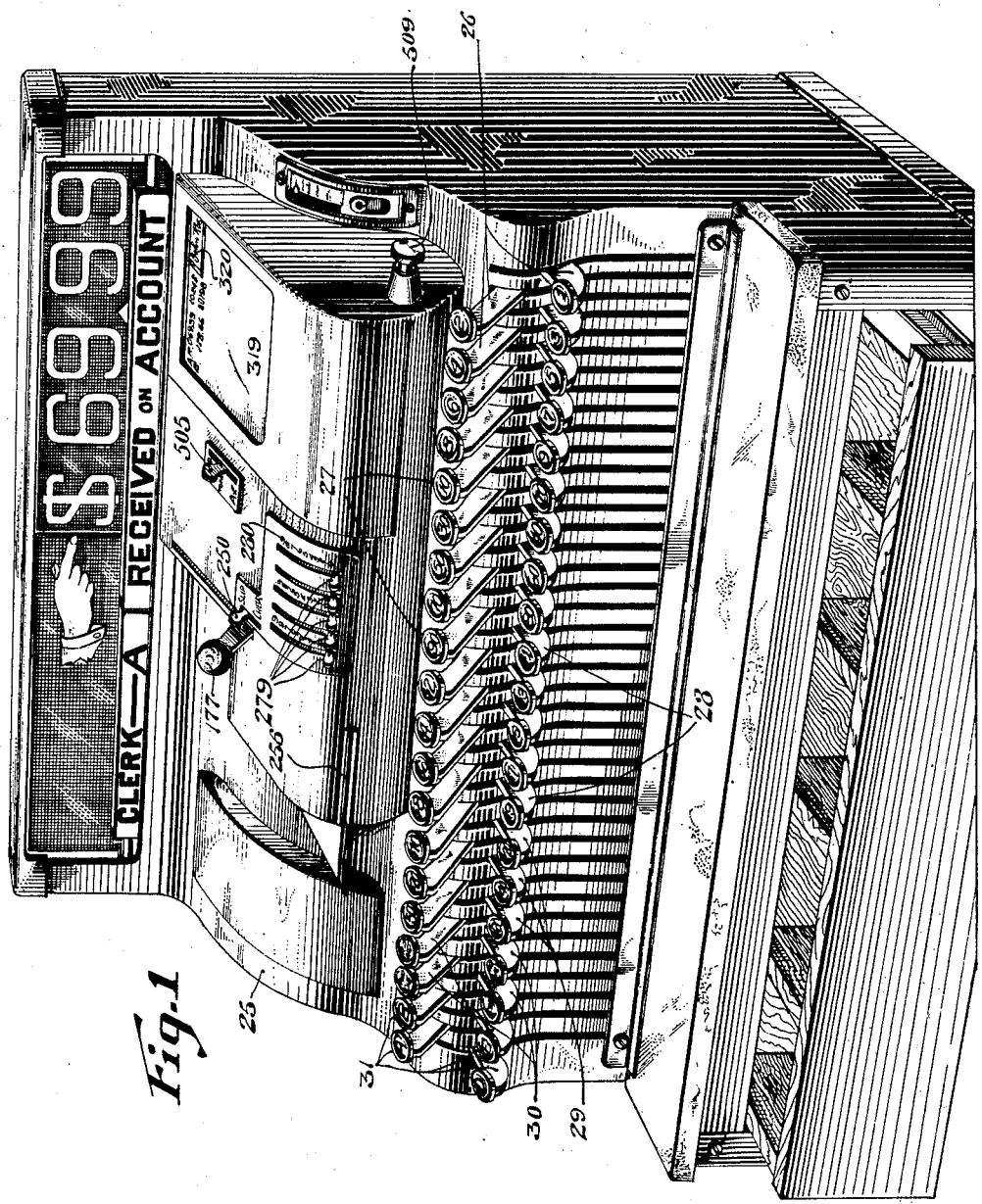
Fig. 1 is a perspective view of the cash register to which the present improvements are applied.

For convenience of description the principal elements of the machine will first be enumerated and their general purposes, arrangement and co-operation will be briefly explained in order to indicate the general operation of the machine as a whole, after which the preferred construction of these parts will be described more in detail together with the function, construction and operation of certain secondary or accessory mechanisms associated therewith.

As shown in the drawings the machine used to illustrate one embodiment of the invention is of the key operated type, that is, the various functions such as registering, printing and indicating, of items are effected directly by operation of the keys. Addition of the present improvements does not materially affect the operation of such machines in any of these respects, but when keys are operated additional type carriers forming a part of the new mechanism are adjusted to represent the keys operated and impressions are then taken from the type carriers upon either a check strip or upon a sales slip depending upon which kind of printing the mechanism has been prepared to do. In this manner the items entered in the machine are successively printed either upon a check contained in the machine or a slip inserted therein. As the items represented by the operating keys are entered in the machine, they are inserted in the selected clerk's totalizing devices as well as in a plurality of accounting devices in the form of sub-totalizers. One of the printing sub-totalizers is adapted to print the accumulated amount upon the record strip retained in the machine and the other upon either the issued check or inserted slip.

In case the machine has been prepared or conditioned for check printing after the keys have been operated and an item printed upon the check strip, the latter is given an increment of movement so as to suitably space the items. When the last item which comprises a part of the sale registered has been entered in the machine, a lever or handle is operated, and in case the machine has been prepared for check printing, it will feed a portion of the check strip containing the record of the successively entered items to a position where it may be severed from the strip. Feeding is performed by a pair of co-operating rollers driven by the handle one of which rollers is provided with an electro for printing advertising matter on the face of the check.

For certain classes of transaction, such as "charge", it is desirable to have the machine so constructed as to print the items upon a slip inserted in the machine and to this end the improved machine is provided with a slot into which sales slips may be inserted to receive impressions.

In the present embodiment the means for conditioning the printer for different kinds of printing is performed by the adjustment of a manipulative device comprising a lever which operates through suitable connections to cause a shifting movement of the check strip bringing it out of the range of the co-operating rollers so that in slip printing operations the inserted slip instead of the check will be fed an increment during successive item entering operations, and will also be fed out of the machine when the total of the transaction is printed. When the mechanism is operated under either slip or check printing conditions an item impression hammer is operated to make the successive impressions upon the desired printing medium. When the check issuing lever is operated a pair of impression hammers, one of which is the same as the item hammer, will be released for operation which will print upon the slip or check the amount standing upon the sub-totalizer together with identifying characters printed by type carriers which will have been previously adjusted. One of the impression hammers just referred to will also print the date as represented by the setting of a series of date adjusting wheels.

The illustrative machine also comprehends the provision of a series of consecutive numbering wheels which are adapted to print consecutive numbers upon the checks as issued, certain operating connections being effected between the check issuing lever and the numbering type carriers for advancing the latter. For printing the numbers upon the checks there is also included a supplemental hammer arranged so that in slip printing operations when the sub-total is printed upon the inserted slip the consecutive number impression hammer will not operate. As the same handle is operated to print the sub-totals upon the issued check as the inserted slip the control lever is provided with mechanism which prevents the addition of a unit upon the number type carriers when the control lever is adjusted to prepare the mechanism for slip printing. It may also be stated that operation of the sub-total lever erases the amount previously standing upon the sub-totalizers so that they are conditioned to again accumulate the items pertaining to the subsequent transaction.

As previously stated the sub-totals printed upon the inserted slip or issued check are also printed upon a record strip positioned within the machine. In order to obtain full information pertaining to each sale auxiliary devices are provided, such as, an improved mechanism for printing ledger numbers upon the record strip and also means for permitting more extended entries in the form of written notations to be made adjacent each printed total. Totals as indicated by the various totalizing devices assigned to the several clerks are printed upon the record strip by the simple manipulation of a lever which when moved in one direction prints from one pair of the totalizing devices and when moved in the other direction prints from the remaining pair. In this manner all the information pertaining to the sales entered in the machine is printed upon the various record mediums thus dispensing with the necessity of reading the numbers from the totalizer wheels.

The general organization and operation of the machine as a whole having been thus outlined the preferred construction of the various parts above referred to will now be described more in detail.

*Supporting frames*

The various parts of the mechanism are supported by a suitable framework comprising a base casting (not shown) to which are attached the main side frames 20, 200 (Fig. 3) the latter being connected at their upper rear ends by a casting 22. Near the center of the machine and parallel to the side frames 20, 200 is a pair of supporting frames 23 (Fig. 4) which serve mainly as the supporting means for the operating racks and the connecting gears and shafts. The right frame 23 (Fig. 4) and a frame 21 also constitute a pair of supporting frames mainly for the totalizing devices. The check printing mechanism is supported at one side by the left frame 23 and a parallel frame 24. The mechanism is enclosed by a cabinet 25 (Fig. 1) of any suitable form and made of any desired material.

Keyboard

The illustrative machine is provided with forty-one keys (Fig. 1) there being three groups of amount keys; one group 26 for entering amounts from 1¢ to 9¢, one group 27 for amounts ranging from 10¢ to 90¢, one group 28 for entering amounts from $1.00 to $9.00, and the remaining group of amount keys 29 for entering amounts from $10.00 to $60.00, inclusive. Four transaction keys 30 are provided for denoting the type of transaction entered into the machine, while situated at the extreme left of the keyboard are four keys 31 designated in the illustrative embodiment as "Clerk's" keys, the purpose and construction of which keys will be explained hereinafter.

Key coupler and driving mechanism

Figure 6:
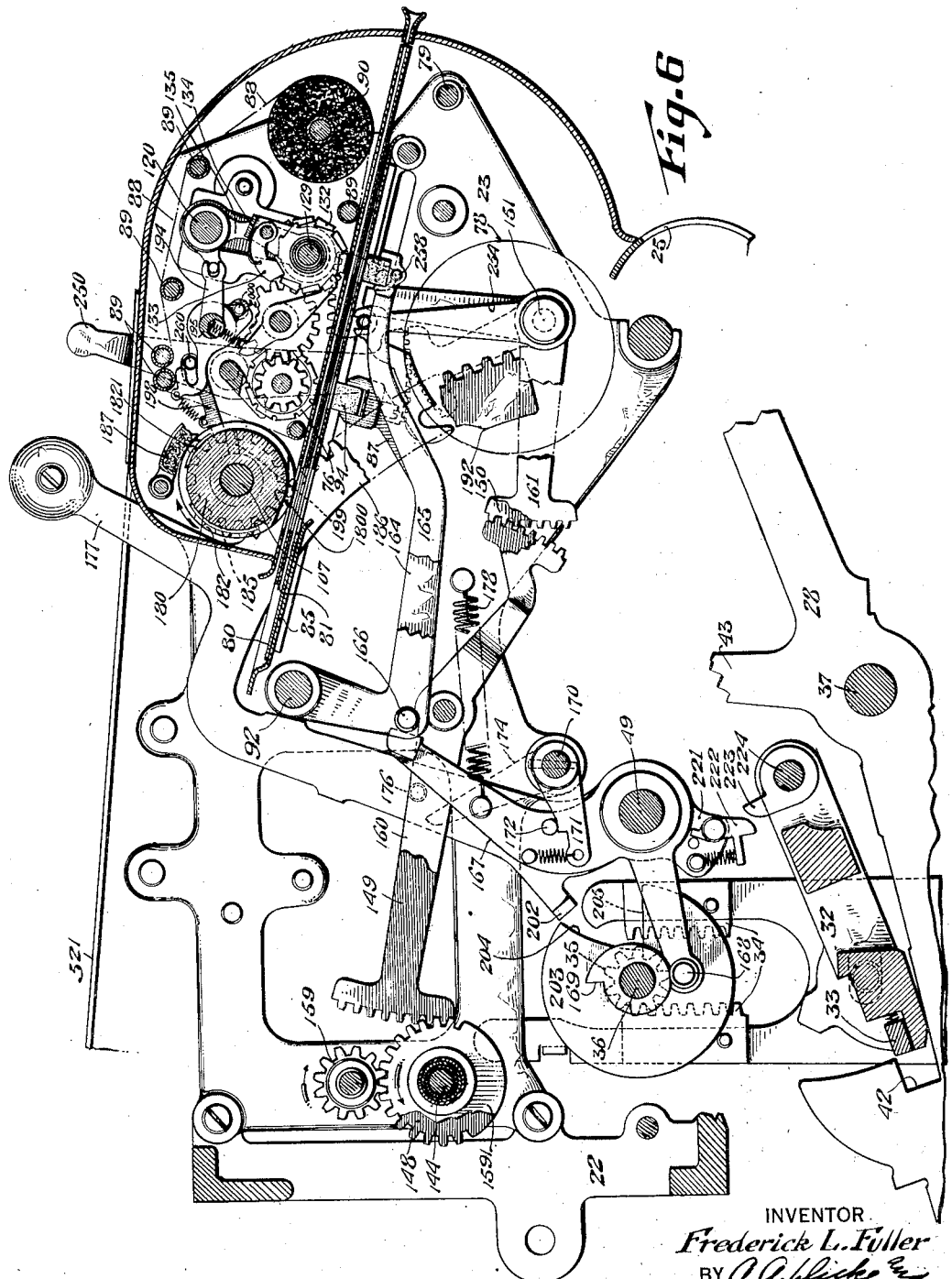
Fig. 6 is a transverse sectional view through the improved printing mechanism showing the impression hammers and their connections to the operating parts of the machine.

As is usual in cash registering machines of the type used for illustration there is provided a key coupler 32 (Fig. 6) pivotally mounted by trunnions between the main side frames 20 and 200. The key coupler normally rests upon all of the operating keys. Mounted upon the nose of the key coupler 32 is a series of spring-pressed latch plates 33 a latch plate being provided for each group of keys. Reference to Fig. 6 shows that the pivotal points of the key coupler 32 and the various keys are displaced with respect to each other so that a circular arc described by the rear edge of the key coupler 32 will intersect the arc described by a co-acting portion of any key about the key shaft as the center. Advantage is taken of these intersecting arcs for the purpose of latching or coupling the keys so that a full depression of any particular key will result in a depression of all the other keys that have been attached to the key coupler by partial depression. This mechanism is old and well known in the art and need not be described herein in detail.

Connected to the key coupler 32 is a plate provided with oppositely facing rack teeth 34 (Fig. 6) meshing with a pinion 35 fast to a shaft 36 which is journaled between the side frames 20 and 200. The rack teeth 34 are adapted to alternately mesh with the teeth of the pinion 35 attached to a shaft 36 so that a complete reciprocation of the key coupler effects a complete rotation of the shaft 36. The mechanism for effecting rotation of the driving shaft 36 is also old and is, therefore, not described herein in detail.

Coupler lifting keys

The keys 31 which are located preferably at the extreme left of the keyboard besides having certain other functions are adapted to elevate the key coupler to what may be termed the "coupling position" in which position the keys representing the nature and amount of the transaction may be engaged with the coupler so that operation or movement of the entire set of keys so engaged with the coupler may be effected by pressing down any engaged amount or transaction key.

Each clerk's or coupler lifting key 31 (Fig. 5) is pivoted at substantially its mid-portion upon a transverse shaft 37 journaled in the side frames 20 and 200, the rear portion of the key being provided with a cam surface 38 co-operating with a face 39 of a shoulder 40 integral with the coupler 32. The surface 41 of the cut in the key provides a stop face which engages the rear edge of the coupler and stops the motion of the keys and the coupler. It is evident that when a clerk's key 31 is depressed the cam edge 38 will co-operate with the shoulder 40 to lift the rear end of the coupler 32 until the surface 41 of the key is brought against the rear edge of the coupler due to the converging paths of movement of these surfaces, to arrest further movement of both the key and the coupler. Any suitable full-stroke mechanism, such as that shown in the Fuller application, Ser. No. 263,125 now Patent No. 1,742,701, and British patents, previously mentioned may be utilized to hold the key and coupler in this partially elevated position. At this time any of the transaction or amount keys may be initially depressed to engage them with the coupler for further operations as will be explained hereinafter.

Amount and transaction keys

The amount and transaction keys which extend nearly across the machine (as clearly shown in Fig. 1) are also loosely pivoted upon the key shaft 37 (Fig. 6) so that they may be moved through an angle about the said shaft as a pivot. Each amount key is provided with a notch, such as 42 engageable with the nose of the key coupler as well as the plate 33 when the keys are depressed so that they may be latched to the coupler.

When the key coupler 32 has been elevated a predetermined distance upon the depression of one of the clerk's or coupler lifting keys 31 the nose of the coupler is slightly above the notch of all the undepressed amount and transaction keys. Mounted on the nose of the key coupler are suitable spring-pressed latch plates 33, as described hereinbefore, which may be forced forwardly upon depression of a key to the coupling point at which point the plate again springs rearwardly into the notch 42 of the key. A further movement of any engaged amount or transaction key will then result in a complete depression of all of the latched keys.

Differential mechanism

Figure 2:
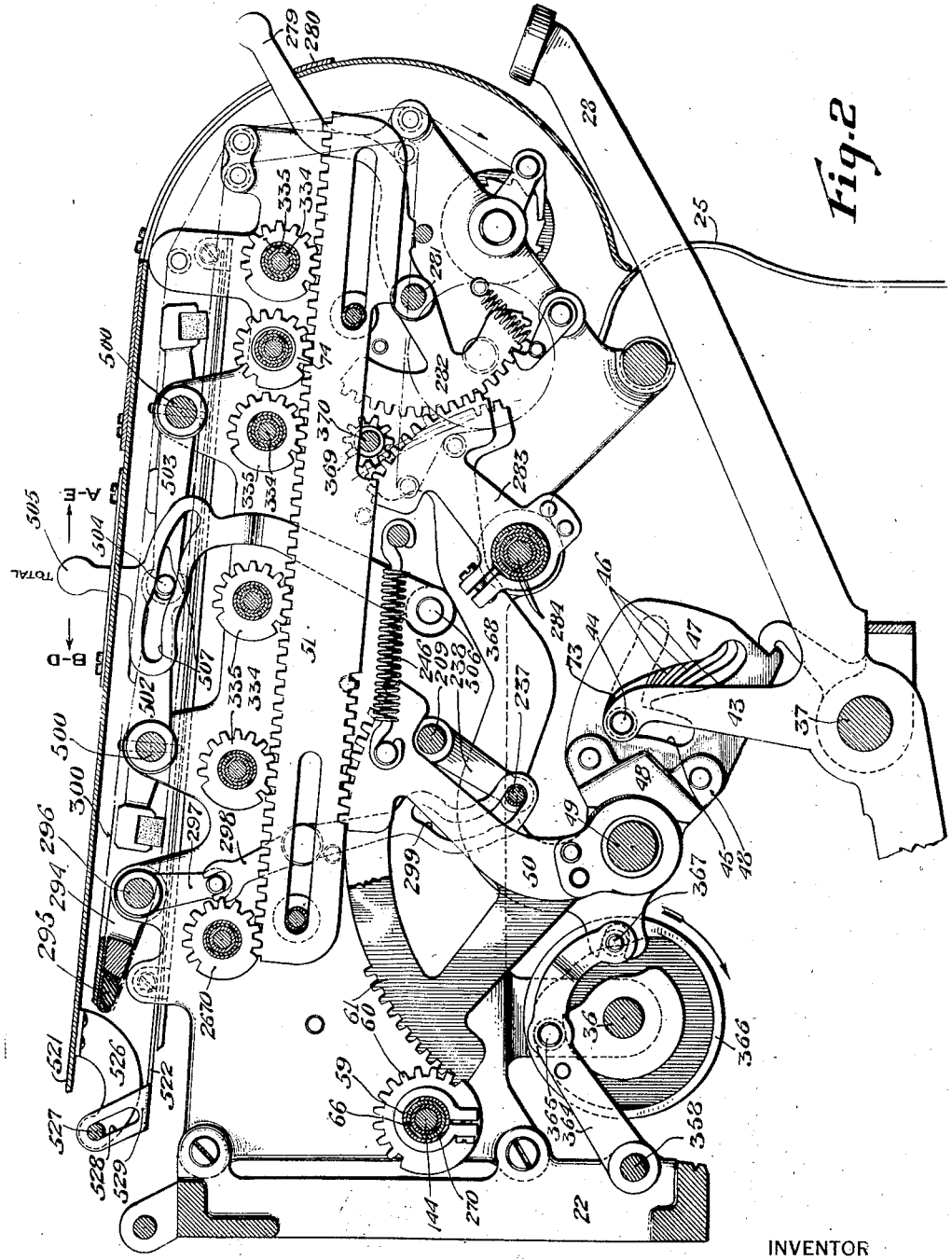
Fig. 2 is a transverse sectional view through substantially the central part of the illustrated machine showing one of the differential devices and the totalizer operating connections.
Figure 7:
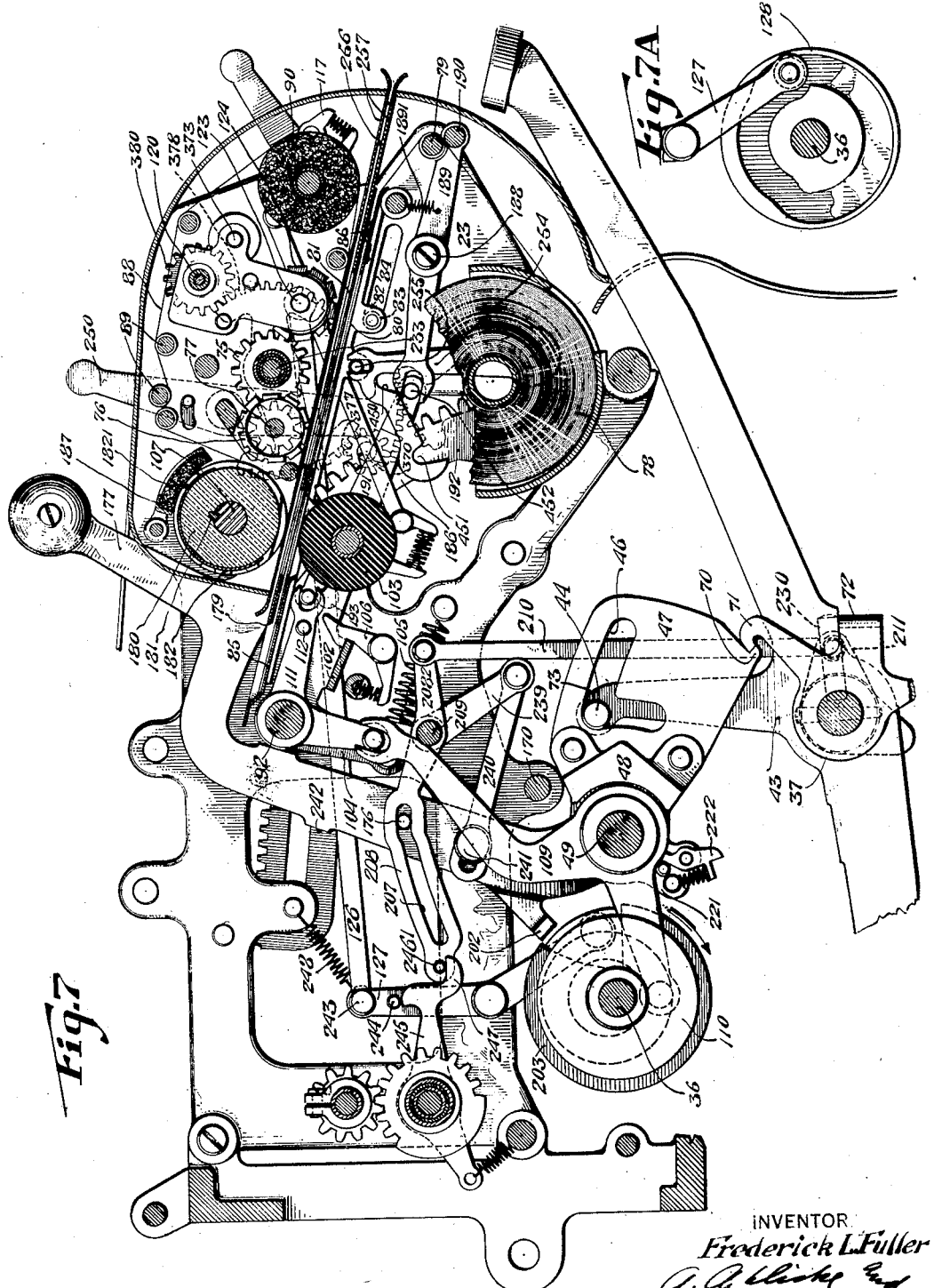
Fig. 7 is a transverse sectional view through the machine showing the improved printing mechanism in relation to the rest of the machine and illustrates particularly the paper feeding devices.

The differential mechanism or devices controlled by each of the various banks of amount keys are all similar in construction and principle of operation and a description of one will suffice for all. Figs. 2 and 7 show the differential devices associated with the dimes bank of keys which will be referred to for the purpose of description.

Each of the amount keys is provided with an upwardly extending arm 43 carrying at its extreme upward end a suitable anti-friction roller 44 which co-operates with either of the branches 45 or 46 of a slot formed in a cam plate 47. The cam plates 47, of which there is one for each key in a group, are carried by a frame 48 journaled upon a shaft 49. The pair of cam slots 45 and 46 in the cam plates 47 are substantially L-shape, the slot 45 being concentric with respect to the shaft 49, while the slots 46 of the different cam plates 47 of a group are graduated in steepness.

The anti-friction rollers 44 of the different keys co-operate with their respective cam slots and from the foregoing it will be evident that upon a depression of an amount key a differential movement will be imparted to the associated frame depending upon the key depressed. When the frame 48 is thus actuated the rollers 44 of the undepressed amount keys remaining in the respective bank will play in the arcuate slots 45 thereby permitting the upward tilting of the cam plates 47 and frame 48 without interfering with the rollers of the undepressed keys.

Securely attached to the differential frame 48 associated with the dimes bank of keys is a segmental rack 50 (Fig. 2) which meshes with teeth formed on the lower edge of a transmitting rack 51. It will be noted by this connection that the rack 51 receives the same movement as the differential frame 48.

Figure 3:
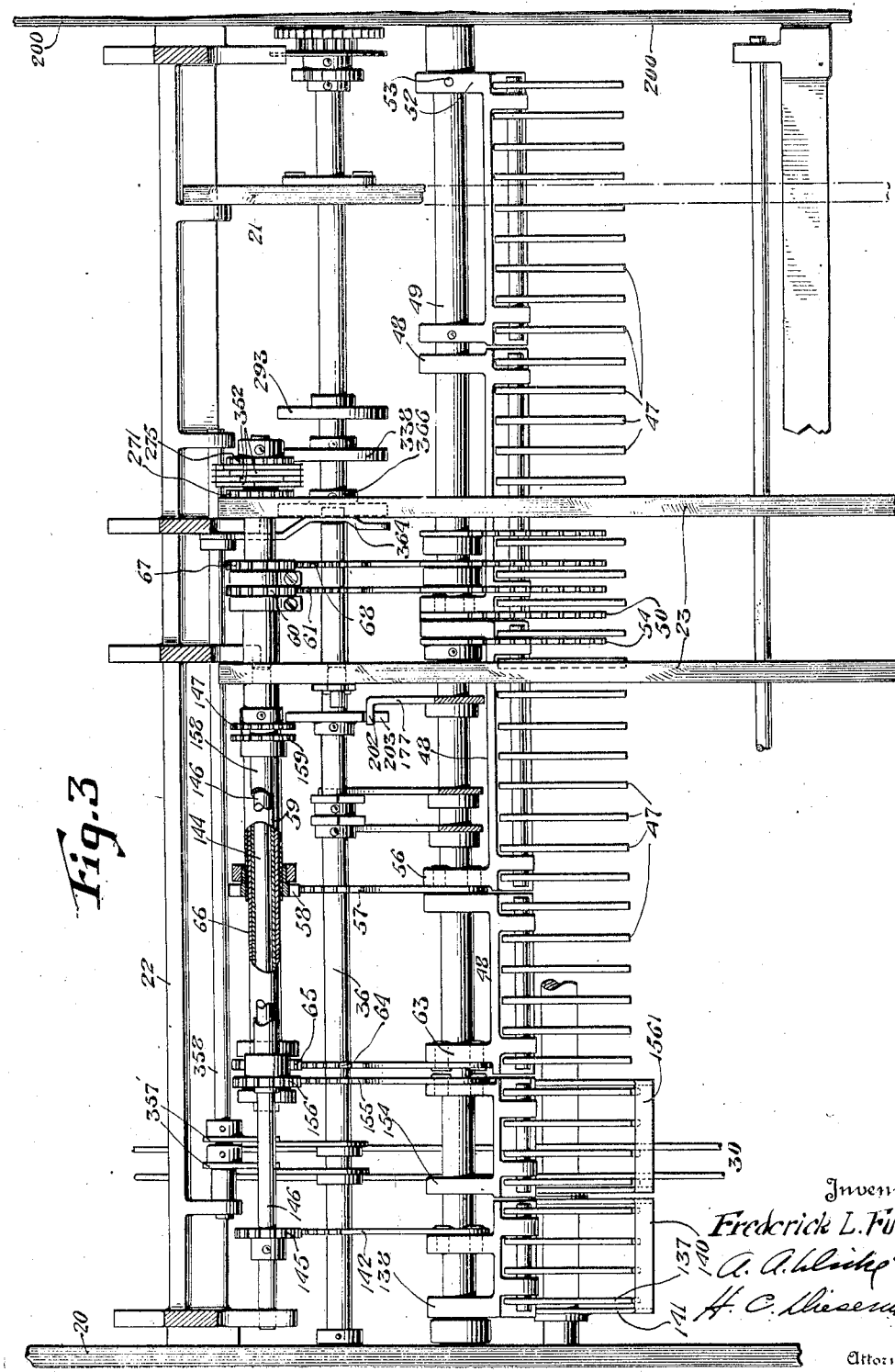
Fig. 3 is a top plan view of the differential devices for the various groups of keys showing their arrangement and connections to the totalizer actuating devices.

It is to be understood that there is a differential frame for each group of amount keys and as shown in Fig. 3, the differential frame 52 associated with the cents bank of keys is pinned by means of a pin 53 to the shaft 49. The shaft 49 has also pinned to it a segmental rack 54 similar to the segmental rack 50 which likewise meshes with the teeth of its respective transmitting rack 55 (Fig. 4).

The differential frame associated with the dollars bank of keys is denoted by reference character 56 (Fig. 3) and has attached thereto a segmental rack 57 which meshes with a gear 58 attached to a sleeve 59. The sleeve 59 has rigidly secured thereto at its opposite end a gear 60 (see Fig. 2) which, in turn meshes with a segmental rack 61, the teeth of which mesh with the teeth formed on the underside of its associated transmitting rack 62 (Fig. 4).

Figure 4:
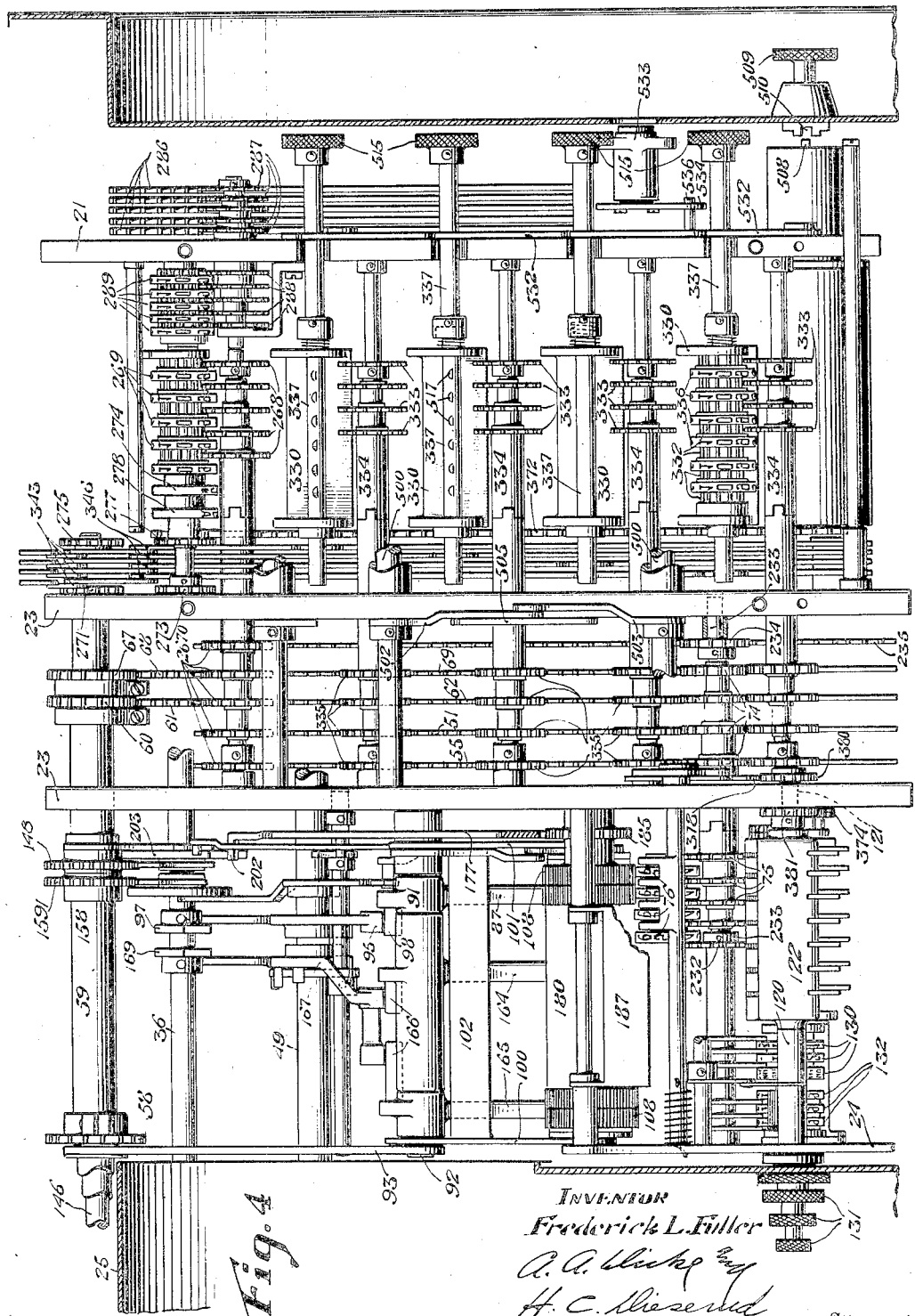
Fig. 4 is a top plan view showing particularly the totalizing devices and their connections to the differential devices. This view also shows some of the improved printing mechanism.

Similarly the differential frame 63 (Fig. 3) associated with the tens of dollars key has attached thereto a segmental rack 64 meshing with a gear 65 attached to a sleeve 66, the sleeve having secured at its other end a gear 67 meshing with a segmental rack 68 (Fig. 2) also loosely mounted upon the shaft 49 and the segmental rack 68 meshes with the teeth formed on the underside of the related transmitting rack 69 (Fig. 4).

By the connections just described, it will be noted that while the amount keys and the associated differential frames are spaced almost entirely across the front of the machine the associated transmitting racks 51, 55, 62 and 69 are centralized between the frames 23 (Fig. 4).

*Means for locking the actuators in normal position*

It is desirable that the segment frame and its connected segmental rack and transmitting rack be locked in normal position. To this end one of the cam plates 47 of each group is provided with a locking projection 70 (Fig. 7) which is adapted to engage with a hooked portion 71 of a forwardly extending member integral with a spring-pressed bail 72, which bail underlies all of the keys of its associated group. A bail 72 is provided for each bank of amount keys so that when any key of a group is depressed its underside will co-operate with the associated bail 72 and thus disengage the hook 71 from the projection 70 so that the operated key may then rock its corresponding cam plate 47 and differential frame. It is thus seen that a partial depression of a key is necessary before the associated differential frame is free to be rocked differentially. Therefore, each cam plate 47 is provided with a concentric portion or dwell 73 to allow the depressed key to unlock its corresponding segment frame before it begins to rock its associated cam plate 47. This dwell corresponds to the angular movement required for latching partially depressed keys to the key coupler. Hence, the actuator lock for each frame is disabled when a key of that group is initially depressed, while if no key in a particular group is operated the corresponding frame is held against accidental or intentional displacement.

*Check and slip printing mechanism*

The illustrative machine is provided with an improved printing mechanism whereby the items which are successively entered in the machine are printed upon either an issued check or inserted sales slip. Additional mechanism is also provided whereby the checks are consecutively numbered when the total of the successively entered items is printed upon the issued check strip but whenever printing upon a slip is performed, the consecutive number will not be printed. Additional mechanism is also provided whereby the date may be printed upon either the issued check or inserted slip together with characters representing the type of transaction entered in the machine and the clerk's key operated.

As will be best seen in Fig. 4, each of the racks 51, 55, 62 and 69 are provided with teeth on their upper edges meshing with a set of gears 74 which have a sleeve connection to a similar set of gears 75 which gears are in continuous engagement with pinions attached to item type wheels 76 (Fig. 7). The item type wheels 76 are loosely mounted upon a shaft 77 which is journaled between the frame members 23 and 24. Thus it is evident that by the connection just described when amount keys are depressed their corresponding racks are moved and given a differential degree of movement so that through the sleeve connection between the gears 74 and 75 the item type carriers 76 will be rotated correspondingly so that when suitable impression means are actuated the type wheels will print the characters indicating the amount of the transaction.

The checks which are printed and issued by the machine are drawn from a roll 78 of paper or other suitable material. The strip passes from the roll 78 around a roller 79 and between plates 80 and 81 which are attached to each other but in spaced relation, the plate 80 having integral ears 82 carrying a stud 83 fitting in a guiding slot 84 formed in the side frame 23. The rearward end of the plate 80 rests upon a plate 85 fixed between the frames 23 and 24. As shown in Fig. 7 between the plates 80 and 81 is a leaf spring 86 which acts against the underside of the plate 81 to provide a tension device for preventing accidental movement of the paper relative to the platen and as will be hereinafter pointed out the plates 80 and 81 are moved under control of a control lever and movement of the plates 80 and 81 will serve to shift the check strip for a purpose to be described later. The check paper in its course between the plates 80 and 81 passes between the item printing wheels 76 and an item printing platen 87 (Fig. 6).

The ink for printing from the type carriers associated with the check and slip printing mechanism is supplied by an ink ribbon 88 (Fig. 6) passing underneath the item type carriers 76 (above the check paper and platen) around supporting rollers 89 and a roller 90 of felt or other material capable of carrying a supply of ink for the ribbon.

Figure 10:
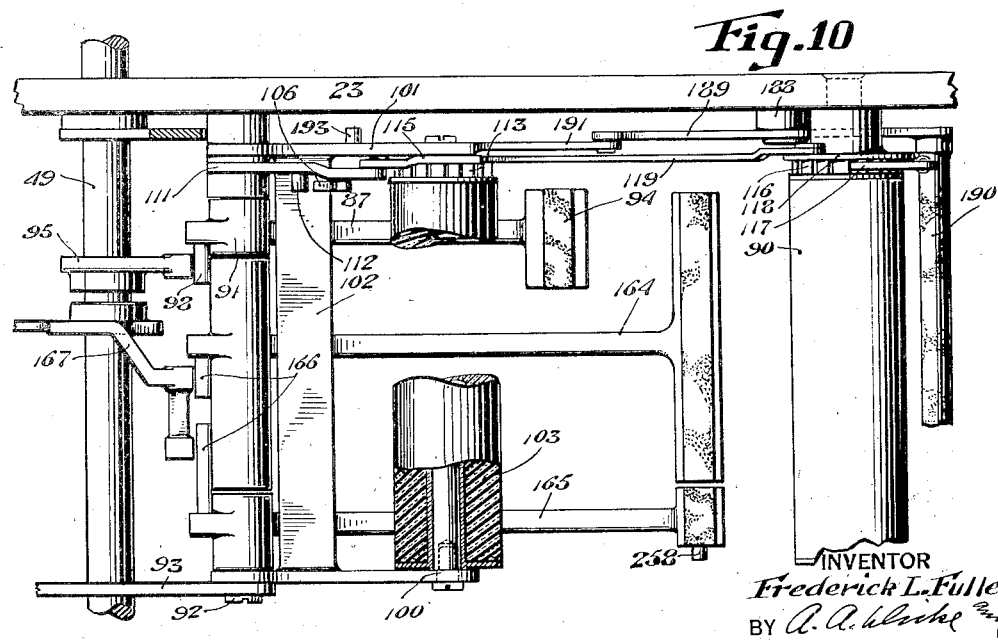
Fig. 10 is a top plan view of the improved printing mechanism showing the arrangement of the various impression hammers.

The impressions from the item type wheels are taken by a percussion hammer 87 (Fig. 8) which as shown in Fig. 10, has a hub 91 loose on a rod 92 which is journaled between the frame 23 and a supplemental supporting frame 93. At its forward end it carries an impression block 94 (Figs. 8 and 10) of rubber or other suitable material and of sufficient length to take an impression of all four of the item type carriers. Printing movement is imparted to the hammer 87 by a bellcrank 95 loosely pivoted upon the shaft 49 and carrying at its extreme end a roller 96 which is in the plane of rotation of a cam 97 attached to the driving shaft 36. The hammer 87 normally rests with a stud 98 attached thereto in engagement with the upper arm of the bell-crank 95 and in this normal position the impression block 94 is at some little distance from the item type carriers. During the rotation of the shaft 36 the cam 97 will act against the tension of a spring 99 connected to the bell-crank 95 until the cam passes out of engagement with the roller 96 whereupon the spring 99 will snap the bell-crank 95 forward so that by its engagement with the stud 98 the item type hammer 87 will be thrown upwardly against the adjusted type carriers to effect a printing impression upon the check strip.

Figure 8:
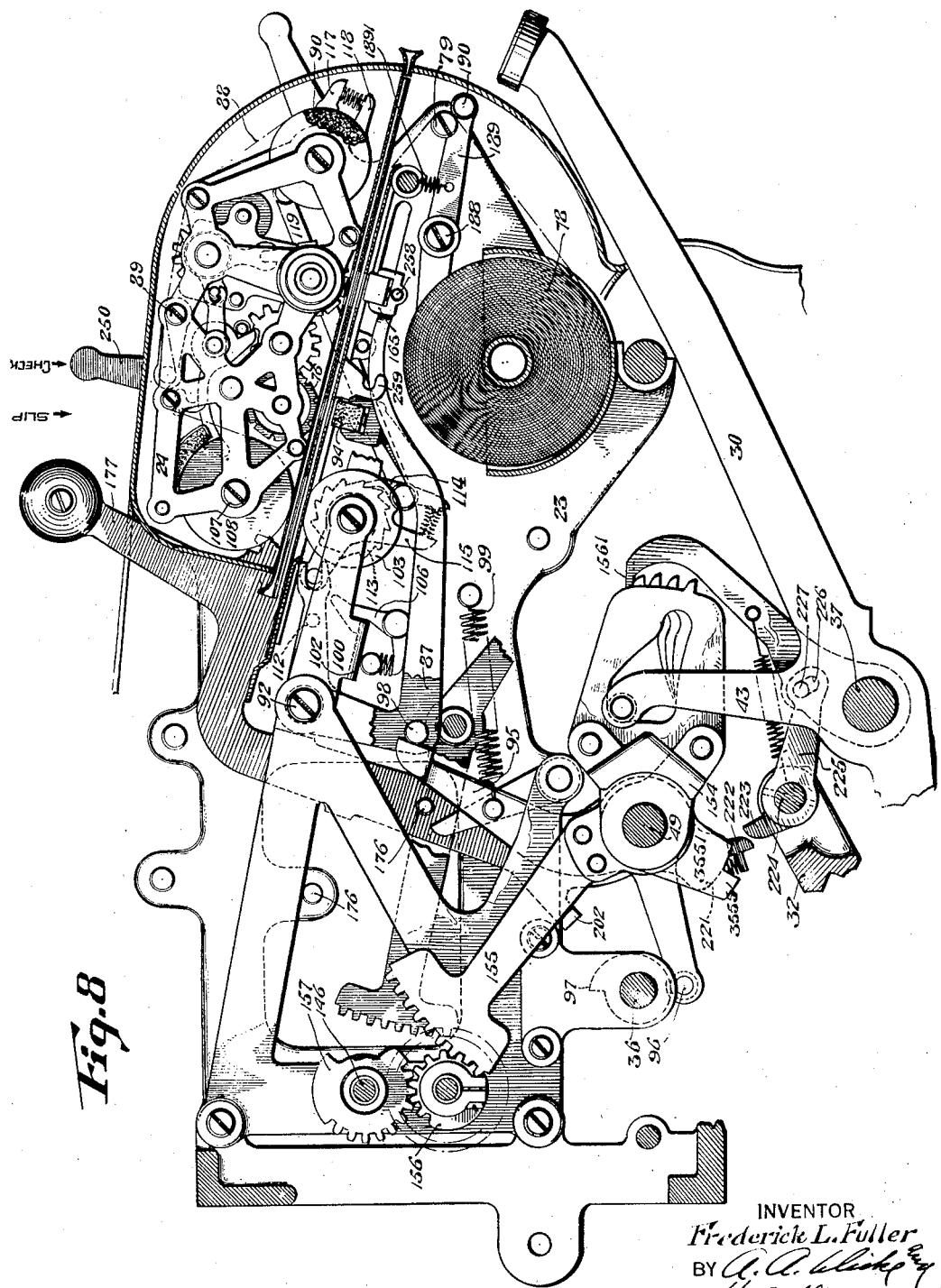
Fig. 8 is a transverse sectional view of the machine somewhat similar to Fig. 7 but taken to one side of the improved printing mechanism.

When the items are successively entered in the machine and printed upon the check it is necessary to give the check strip a slight feeding movement so as to suitably space the items. To this end there is loosely mounted upon the shaft 92 a yoke frame comprising a pair of forwardly extending arms 100 and 101 (Fig. 10) connected by an integral cross member 102 said arms having journaled therein a feeding roller 103. Extending downwardly and integral with the arm 101 is an arm 104 (Fig. 7) to which is connected a spring 105. The tension in the spring tends to raise the feeding roller 103 upwardly against the check paper but in the normal condition of the machine which is after a total has been printed upon an issued check or inserted slip, it is prevented by a spring-pressed latch pawl 106 engaging a portion of the cross member 102. Journaled between the frame members 23 and 24 is a shaft 107 (Fig. 8) having loosely mounted thereon a pair of wheels or rollers 108 (Fig. 4) and as shown in Fig. 8, the co-operating rollers 103 and 108 are, after a sub-totaling operation, disengaged from each other.

Loosely mounted upon the segment shaft 49 is a bell-crank 109 (Fig. 7) one arm of which carries a roller co-operating with a cam slot formed in a box cam 110 which is adapted to oscillate the bell-crank 109 during each operation of the machine. Connected by a pin and slot connection to the bell-crank 109 is a second bell-crank 111 loosely mounted upon the shaft 92, the forward arm of the bell-crank 111 carrying a pin 112, which as shown in Fig. 10, is in the plane of the latch pawl 106. At a certain point in the first item entering operation of the machine the pin 112 contacting with the latch pawl 106 will disengage the latter from the cross member 102 so that the spring 105 will be effective to force the roller 103 in contact with the co-operating feeding rollers 108. It is to be understood that the plates 80 and 81 are suitably apertured so that the roller 103 may force the check paper against the roller 108. Connected to the feeding roller 103 is a ratchet wheel 113 (Figs. 8 and 10) co-operating with a feeding pawl 114 carried by an arm of a plate 115 which is connected by a pin and slot connection to the bell-crank 111. By the construction just described, it will be obvious that when the feeding rollers are in co-operative relationship with each other an increment of movement will be given to the roller 103 by the engagement of the feeding pawl 114 with the ratchet wheel 113, and in this manner before each item subsequent to the first is printed upon the check strip the latter is given a step of movement so that the successively printed items will appear as shown in Fig. 13. It is to be understood that the feeding rollers 103 and 108 are continuously in co-operative relationship during all the item entering operations, comprising a single transaction, but as will be described hereinafter, they are disengaged from each other after the sub-total has been printed upon the check strip.

It is desirable that the inking ribbon be given a step of movement after each item entering operation. This not only prevents successive impressions through the same portion of the ribbon, but it also serves to bring the different portions of the ribbon into contact with the roller 90 to permit it to moisten or apply new ink to the ribbon 88. The mechanism for driving the ribbon comprises a ratchet disk 116 (Fig. 10) rigid with the inking roller 90 and a feeding pawl 117 carried by an arm 118 which is connected by a link 119 (Fig. 8) to the arm 115. The mechanism just described is so proportioned and connected that at each oscillation of the arm 115 the link 119 will also rock the arm 118 and through the co-operation of the feeding pawl 117 with the ratchet disk 116 the roller 90 will be given a step of movement to feed the inking ribbon 88.

In order to accumulate the items which are successively entered in the machine the illustrative machine is provided with a totalizer which is not only adapted to accumulate the items, but also to print the totals upon the check strip after which the totalizer is subsequently cleared so as to be prepared to accumulate a series of items relating to the next sale or transaction.

A totalizer frame 122 is journaled, at its upper end, between frames 23 and 24 by a shaft 120 (Fig. 4) at one side and by a short shaft 121 at its other side and carries at its lower end a shaft 123 (Figs. 7 and 11), upon which are loosely mounted a series of total printing wheels 124 each wheel having connected thereto a totalizer pinion 125 which is in the plane of a related operating pinion 75, but which is normally disengaged therefrom. At a certain point in the operation of the machine the totalizer frame may be swung about its pivotal point so as to bring the pinions 125 into mesh with the operating pinions 75 and to effect this result there is attached to the shaft 123 a link 126 (Fig. 7) which is connected to a bell-crank 127 carrying a roller at its lower end co-operating with a cam 128 (Fig. 7A) attached to the drive shaft 36. By the connection just described it will be obvious that rocking of the bell-crank 127 by means of the cam 128 will, through the link 126 rock the totalizer about its pivotal point so as to engage the totalizer pinions with the operating pinions 75 on each operation of the machine so that every item which is printed by the item type wheels 76 will also be added in the totalizer wheels 124 and the latter will represent the total amount of the entries received by the totalizer since the preceding clearing operation.

As previously stated mechanism is also provided whereby the date and consecutive number of the check may be printed upon the issued check whenever the total is printed. In axial alignment with the shaft 123, which, it will be remembered, is the supporting shaft for the total printing wheels 124, is a shaft 129 (Fig. 11) which carries date printing wheels 130. Each of the date printing wheels 130 has a sleeve and shaft connection to its associated date setting wheel 131 which projects outside of the supporting frame 24. By means of the date setting wheels 131 which are in the form of knurled knobs, the type carriers may be adjusted to represent the month and the day on which the checks are being issued.

Mounted upon the shaft 129 and therefore, in axial alignment with the date printing wheels 130 and total printing type elements 124 are three type carriers 132 (Fig. 11) for printing the consecutive numbers upon the checks. The consecutive numbering type carriers are of the well known deep notch transfer type and the mechanism for operating them comprises a multi-tined operating pawl 133 (Fig. 12) pivotally mounted on a stud carried by an operating bail 134 to which is connected a bell-crank 135 loosely mounted upon the shaft 120. Certain connections are effected from the bell-crank 135 to the sub-total lever in order to add a unit to the numbering wheels after each check issuing operation as will be described hereinafter.

Figure 5:
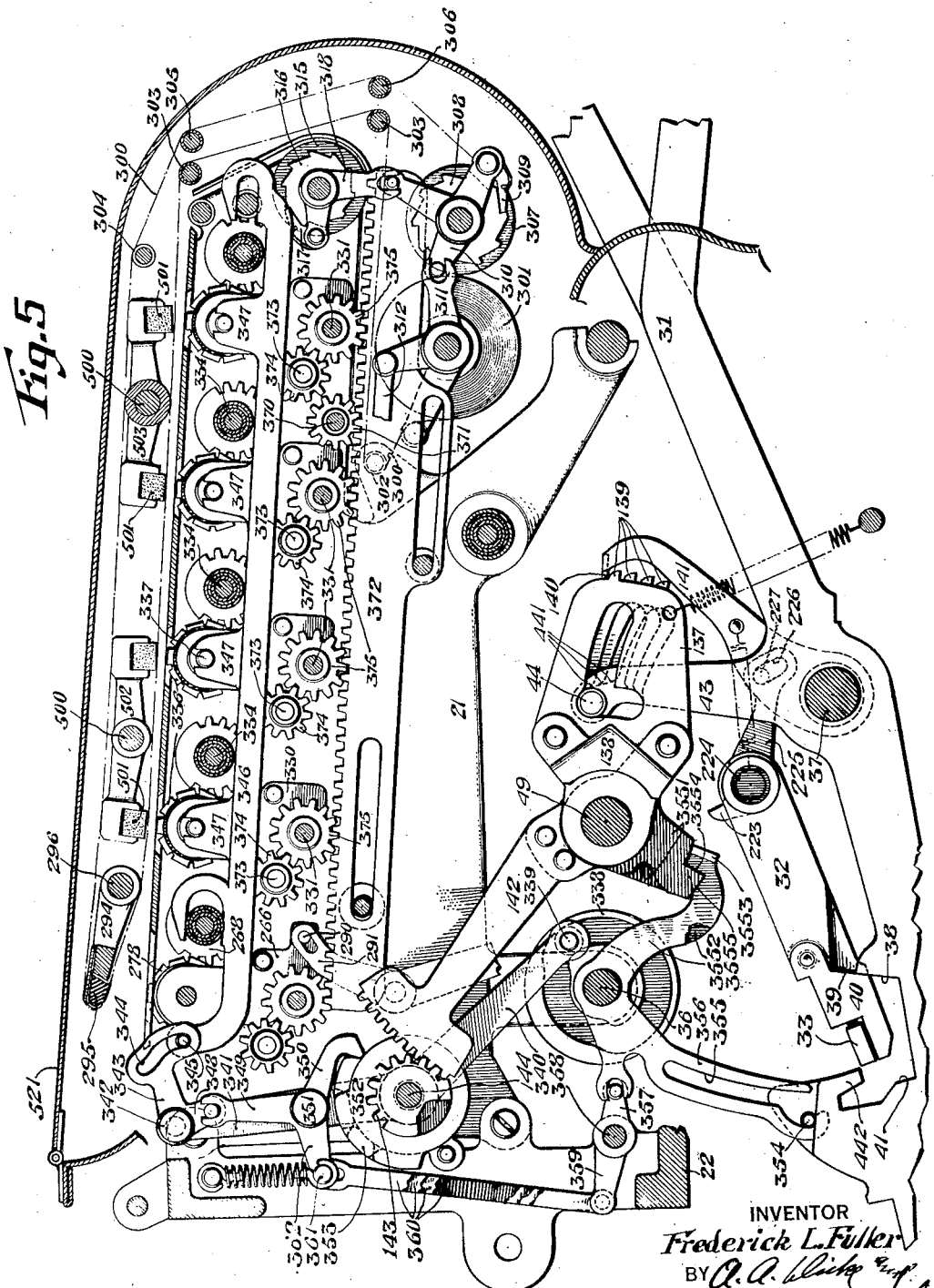
Fig. 5 is a transverse sectional view of the machine which shows in detail the totalizer engaging and disengaging devices.
Figure 15:
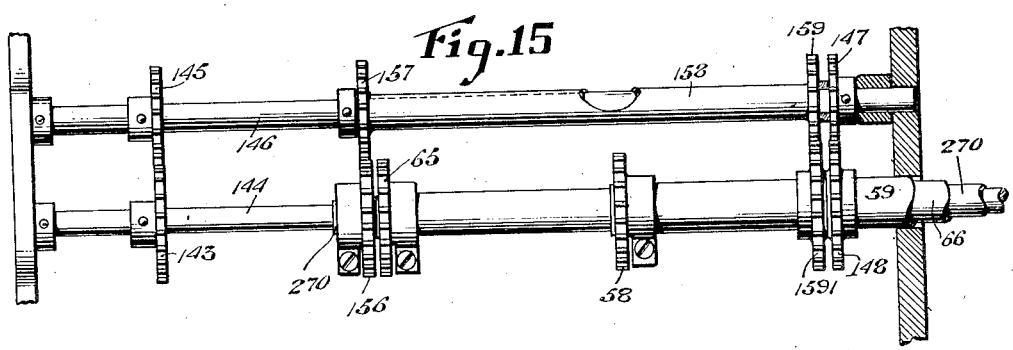
Fig. 15 is a detail of the connecting devices comprising part of the differential mechanism.

It is advantageous to print a character designating the clerk's key operated as well as a symbol identifying the type of transaction entered in the machine. To accomplish this result each of the clerk's keys 31 is provided with a differential device similar to that described in connection with the amount keys and, as shown in Fig. 5, comprises the arm 43 carrying the roller 44 co-operating with a cam portion 441 of a slot formed in a cam plate 137 carried by a differentially moved frame 138 loosely mounted upon the shaft 49. It will be noted that each of the cam plates 137 associated with the clerk's keys is provided with a projection 139 co-operating with a beveled plate 140 of a spring-pressed latch bail 141 loosely pivoted upon the key shaft 37. It will be noted further that when a clerk's key is partially operated the roller will immediately act against the cam portion 441 so that the associated cam plate 137 will be moved differentially at the initial movement of the key and the projection 139 will be caught by the latch bail 140 thereby retaining the frame 138 in its differentially moved position. Attached to the frame 138 is a segment 142 which meshes with a pinion 143 securely attached to a shaft 144 which is the supporting shaft for the sleeves 59 and 66 (see Figs. 3 and 15) previously mentioned. The pinion 143 meshes with a somewhat larger pinion 145 attached to a shaft 146 which is above and parallel to the shaft 144. Attached to the other end of the shaft 146 is a pinion 147 which meshes with a pinion 148 loosely mounted on the sleeve 59. The pinion 148 meshes with the teeth formed on one side of a bell-crank segment 149 (Fig. 6). The forward end of the bell-crank segment 149 meshes with a second bell-crank segment 150 loosely mounted on a shaft 151 passing through the frame member 23. The upper arm of the bell-crank segment 150 is provided with teeth meshing with a gear 152 (Fig. 11) attached to the shaft 123 the other end of the shaft having rigidly secured thereto a type carrier 153 carrying initials designating the different clerk's keys.

A somewhat similar connection for adjusting a transaction type carrier is provided. As shown in Fig. 8, the arms 43 of the transaction keys 30 similarly differentially adjust a frame 154 to which is attached a segment 155. When the frame 154 is differentially adjusted by the depression of a key it is held in that position by a spring-pressed bail 1561 (similar to the latch bail 140 described in connection with the clerk's differential mechanism). The segment 155 attached to the frame 154 meshes with a gear 156 loose on the shaft 144. This gear meshes with a gear 157 (Fig. 15) attached to a sleeve 158 loose on the shaft 146. At the opposite end of the sleeve 158 is secured a gear 159 which meshes with a gear 1591 loosely mounted on the sleeve 59. The gear 1591 co-operates with the teeth of a bell-crank segment 160 (Fig. 6) the latter in turn meshing with a second bell-crank segment 161 (Fig. 11). The bell-crank segment 161 meshes with a gear 162 which has a sleeve connection to the transaction type carrier 163.

It will be noted that by the mechanism just described when the first item is entered and the desired clerk and transaction keys are depressed the related differential frames will be held in their adjusted positions, thereby retaining the clerk's type carrier 153 and transaction type carrier 163 in their differentially adjusted positions.

As the key coupler is raised still further by the depression of one of the amount keys the initially depressed clerk's key will be carried along with it since a finger 442 on the clerk's key is carried over the latch plate 33 when the clerk's key is initially depressed. The cam portions 441 of the plates 137 extend into dwell portions so constructed that after the initial rocking of the frame 138 by a certain key the corresponding dwell portion will be concentric with the shaft 37 thereby permitting the further rocking movement of the operated roller 44 without effecting any further movement of the frame 138. When the key coupler returns, the operated clerk's key is also returned to normal, the frame 138 being left in the position to which it was shifted by the clerk's key. A similar construction of the cam slots in the plates carried by the frame 154 is provided for the transaction differential mechanism so that it will only be necessary to depress a clerk's or transaction key once during the successive item entering operations. It will be understood that the attachment of the transaction key to the coupler for full operation during the entry of the first item is effected through the same sort of means as used for the amount keys rather than the type of means used for the clerk's keys.

Impressions are taken from the total type carriers 124, transaction type carrier 163, clerk's type carrier 153 and date printing type carriers 130 (Fig. 11) by means of a percussion hammer 164 (Fig. 10) which carries a rubber impression block of sufficient length to co-operate with the assembly of type carriers just mentioned. An impression hammer 165 is also provided to effect printing impressions from the consecutive numbering type carriers 132. The hammers 164 and 165 both have their hubs pivotally mounted upon the rod 92 and each is provided with oppositely facing studs 166 which co-operate with the upper arm of a pivoted bell-crank 167 (Fig. 6). One arm of the bell-crank carries a roller 168 in the plane of a cam 169 fastened to the driving shaft 36. Attached to a short shaft 170 is a spring urged latch pawl 171 which is in the plane of a stud 172 attached to the bell-crank 167. Figure 6 shows the condition of the machine after a sub-total has been printed, the parts being ready for subsequent item entering operations. During the first item entering operation the cam 169 co-operating with the roller 168 will rock the bell-crank 167 counter-clockwise whereupon the latch pawl 171 will engage the stud 172 holding the bell-crank 167 so it will be held in its slightly rocked rearward position permitting the impression hammers 164 and 165 to drop downwardly away from the printing type carriers, the pair of studs 166 at this time following and contacting with the upper arm of the bell-crank 167.

Attached to the shaft 170 is an arm 174 which is in the plane of a stud 176 attached to a sub-total printing lever 177. The sub-total lever 177 is loosely pivoted upon the shaft 49 and when it is desired to print the total of the amounts entered in the sub-totalizer 122 together with the data set up on the clerk's, transaction, date printing and consecutive numbering type carriers the handle of the sub-total lever 177 is merely forced rearwardly from the position shown in the drawings. When the handle 177 is moved slightly rearwardly the pin 176 contacting with the upper end of the arm 174 will rock the shaft 170 thereby disengaging the latch pawl 171 from the stud 172 and permitting a spring 178 connected to the bell-crank 167 to rock the upper arm of the latter forwardly and by its engagement with the studs 166 the hammers 164 and 165 will be both thrown against their type carriers to take an impression upon the check strip which is at this time located beneath the type carriers.

The manner in which printing impressions will appear upon the check is shown in Fig. 13 wherein it will be noted that in line with the printed sub-total are characters representing the clerk's key operated, a character such as a star, indicating the type of transaction entered, the date and the consecutive number of the check. After the printing operation has been performed the sub-total lever 177 is moved still further rearwardly to issue a check by means which will presently be described in detail.

When a check has been fully ejected by an operation of the sub-total lever 177 it is detached from the strip, the rear edge 179 (Fig. 7) of the plate 81 serving satisfactorily as a tearing guide. The next check to be issued, will, therefore, prior to any printing of items thereon, have one end adjacent the tearing edge 179 and will be located between the roller 103 and a feeding roller 180 which has a splined connection 181 to the shaft 107 which it will be recalled also carries the feeding wheels or rollers 108. The roller 180 is adapted to carry on its periphery a pair of electros 182 and 1821 for printing any desired matter, and in the present machine the electro 182 is designed to print the name of the proprietor and the character of the business while the electro 1821 prints the legend "Total of purchases".

The sub-total lever 177 is provided with a segmental rack portion 186 (Fig. 6) which during the movement of the lever will actuate a gear 185 rigidly connected to the shaft 107 and, therefore will rotate the roller 180. As the handle of the sub-total lever 177 is swung rearwardly the segmental rack 136 will drive the gear 185 to give the feeding roller a complete revolution thereby feeding the paper outwardly and during the movement of the feeding roller the electros 182 and 1821 will print the desired matter upon the issued check. Ink is supplied to the electroroller by a spring-urged felt pad 187. It will be noted that the advertising matter contained on electro 182, that is, the data shown at the top of the receipt (Fig. 13), is printed during the preceding check issuing operation so that there is at all times a check in the machine upon which is printed the desired advertising matter. The words "Total of purchases" are printed at the same time as the other data, but this portion of the check is fed out of the machine and torn off with the printed receipt.

Attention is also directed to the fact that in order to prevent rotation of roller 180 by the feeding roller 103 during item entering operations at which time the wheels or rollers 108 are active the roller 180 is cut away at 1800 to prevent contact with the roller 103. Thus, feeding of the check paper by the lever 177 is not effective until the lever 177 is partially operated and during this initial movement the platens 164 and 165 are released to print on the check paper before it is fed. As the rollers 108 are loose on shaft 107 they will not move during the initial movement of roller 180 on check issuing operations; but, during such operations, said rollers 108 will rotate when said roller 180 turns the roller 103.

The leaf spring 86 (Fig. 7) will act to hold the check paper and prevent any tendency to withdraw the check strip from the storage roll during the tearing operation, but as a precautionary device there is pivoted upon a stud 188 a spring-urged bell-crank 189 which carries a roller 190 in engagement with the roller 79. When the rollers 108 and 103 are in co-operation for feeding the check strip during successive item entering operations the rollers 190 and 79 will be disengaged since the rearward arm of the bell-crank 189 has a pin and slot connection to an extension 191 of the arm 101. (See also Fig. 10.)

It will be recalled that during successive item entering operations as well as a check issuing operation the feeding roller 103 is raised into co-operative relationship with the roller 180, but when the handle of the sub-total lever reaches its extreme rearward position a camming projection 192 (Figs. 6 and 7) formed on the segmental rack 186 will engage a pin 193 (see also Fig. 10) carried by the arm 101, thus positively moving the yoke frame carrying the roller 103 downwardly, until it is latched in its downward position by engagement of the latch pawl 106 with the cross member 102. Downward movement of the extension 191 will permit the spring 1891 connected to the bell-crank 189 to urge the roller 190 against the roller 79 so as to suitably hold the record strip to permit its being torn off without any danger of drawing the paper from the supply roll 78. When the sub-total lever 177 reaches its extreme rearward movement it is again drawn forwardly to its normal position, it being understood that since at this time the feeding rollers 103 and 180 are separated the return movement of the lever will be permitted without effecting any reverse movement of the check paper.

In order to add a unit to the consecutive numbering type carriers to print the number of the check to be next issued, the following mechanism is employed. As previously stated the bail 134 (Figs. 6 and 11) has connected thereto a bell-crank 135 and connected to one arm of the bell-crank 135 is an arm 194 (Fig. 12) rigid with a shaft 195 which shaft carries at one end an arm 196. Loosely mounted upon the shaft 195 but connected to the arm 196 by a spring 197 is an operating arm 198 in the plane of a projection 199 integral with the gear 185. By the construction just described, it will be obvious that when the sub-total lever is moved rearwardly the gear 185 will be given a clockwise rotation and by the engagement of the projection 199 with the upper edge of the arm 198 will rock the arm 198 counterclockwise and by the connecting spring 197 will rock the arm 196 and shaft 195 counter-clockwise. Through the arm 194 the bell-crank 135 will be rocked clockwise rocking the bail 134 and the feeding pawl 133 rearwardly. This oscillation of the pawl by its engagement with the ratchet teeth integral with the consecutive numbering wheels will add one on the consecutive numbering type carriers. At the extreme end of the forward or return movement of the lever 177 the projection 199 will act upon the underside of the arm 198 (opposite to that engaged during the rearward movement of the lever) and since the arm 198 is provided with a stud 2000 engaging a shoulder 201 of the arm 196, the stud will positively rock the shaft 195 clockwise and through the train of mechanism just described will restore the bail 134 to its normal position shown in Fig. 6. When the machine is in condition for check issuing operations a unit will be added to the consecutive numbering type carriers each time the lever 177 is operated and thereby consecutively number the issued checks.

Any suitable full-stroke mechanism may be provided to compel a complete movement of the sub-total lever 177 and the handle in both directions, and since the mechanisms of this character are well known in the art no showing has been made of such a device.

The sub-total lever 177 and the shaft 36 are provided with co-acting means preventing operations of the keys if the lever 177 is shifted from its normal position and which will, on the other hand, prevent movement of the feeding handle if a key has been depressed and the shaft therefore given a partial rotation. In the present machine this coacting means consists of a lug 202 (Fig. 6) extending laterally from the side of the feeding lever or handle and a disk 203 fastened to the shaft. When the shaft is in its normal position, the position in which it is shown in Figure 6, a cut-away portion 204 will be in the path of the lug 202. This cut-away portion is concentric with the shaft 49 and when the feeding handle is operated the lug 202 will travel down until it is arrested by the portion 205 on the locking disk. It is apparent that rotation of the shaft 36 and of course operation of the keys of the machine will be prevented until the handle is returned far enough to carry the lug 202 out of the path of the portion 204 of the locking disk. It will also be apparent that when the shaft begins its rotation the periphery of the disk 203 will be carried under the lug 202 thereby preventing any movement of the feeding handle until the rotation of the shaft 36 is completed.

Cash drawer release

It is desirable to release the cash drawer each time that a sub-total is printed upon the record medium and to accomplish this function pin 176 (Fig. 7) attached to the sub-total lever 177 engages a slot 207 formed in an arm 208 loosely pivoted upon a short shaft 209 which as shown in Fig. 18 is journaled in the intermediate frames 23. Connected to the arm by a sleeve 2081 loose on the shaft 209 is an arm 2082 which is connected to a downwardly extending link 210 to which is connected an arm 211 (Fig. 17) pinned to the shaft 37. The shaft 37, at a certain point, has attached to it an arm 212 having a pin and slot connection to a trip member 213, the rearward extension of which overlies a stud 214 carried by a drawer catch release lever 215.

The drawer catch release lever 215 is pivoted on a bracket attached to the base of the machine and is provided with a hook 216 engaging a drawer catch 217 which is provided with a notch 218 engaging a bracket 219 carried by the cash drawer. The cash drawer is normally urged outwardly by a spring of the usual type (not shown). Another spring connects the drawer catch release lever 215 and the drawer catch 217. The result of the above construction is that when the sub-total lever 177 is moved rearwardly the pin 176 co-operating with the slot 207 will rock the member 208 clockwise and force the link 210 downwardly and through the train of mechanism just described will rock the trip member 213 counter-clockwise (Fig. 17). Since the trip member engages the stud 214 it will rock the drawer catch release lever 215 thereby releasing the hook 216 from the drawer catch 217 permitting the drawer to fly open under the influence of the drawer spring.

Disabling devices for clerk's and transaction differential frames

Figure 16:
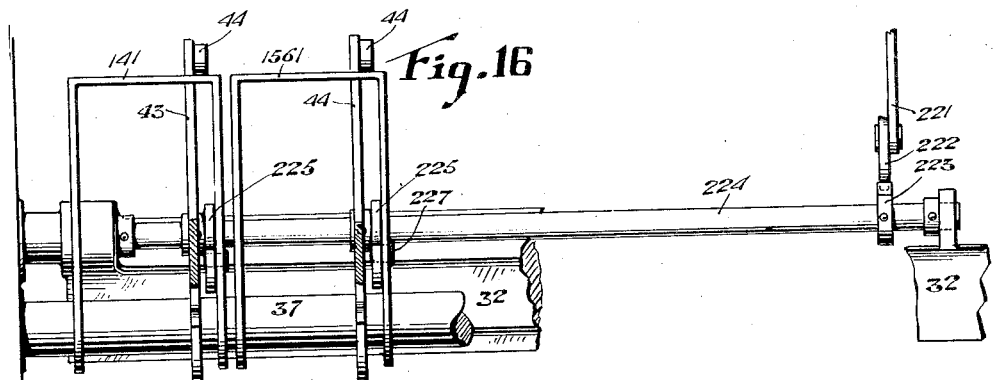
Fig. 16 is a front view showing the disabling devices for the means for latching the differential devices in adjusted position.

In order to release the differential frames associated with the clerk's and transaction banks after a sub-total has been printed the lever 177 is provided with a downward projection 221 (Fig. 6) which carries a by-pass pawl 222 in the plane of a trip arm 223 securely attached to a shaft 224 which extends between and is in alignment with the pivotal points of the key coupler and is rotatably carried by the coupler. (See Fig. 16.) The shaft 224 has rigidly secured thereto a pair of forwardly extending arms 225 (Figs. 5, 8 and 16) each of which is provided with a cam slot 226 adapted to engage a pin 227 carried by its associated latch bail 1561 or 141. As the sub-total lever is moved rearwardly to issue a check the pawl 222 will rock idly on its pivot as it passes the arm 223 and will be placed in front of the latter. Now as the lever is moved towards its normal position from its rearwardly moved position the pawl 222 will engage the trip member 223 and rock the shaft 224 thereby rocking the arms 225 and through the cam slots 226 engaging the pins 227 the latching bails 141 and 1561 will be rocked clockwise (Figs. 5 and 8) thus disengaging them from the projections carried by the cam plates which have previously been operated, and when a complete disengagement is effected, the differential frames will drop downwardly by virtue of their weight (or assisted by a spring—see Fig. 5) to their normal positions thereby restoring the transaction and clerks' type carriers to their normal positions.

Resetting of sub-totalizer

After the sub-total has been printed upon the record medium it is desirable to reset the sub-totalizer elements in order to accumulate the items pertaining to a subsequent sale. Resetting of the sub-totalizer elements in the illustrative machine is accomplished by positively moving the actuating racks rearwardly to their rearmost position and after the sub-totalizer pinions have been engaged with their related driving pinions the racks are permitted to move forwardly until the transfer tripping projection of each totalizer element engages a portion of the transfer mechanism whereby the racks will be stopped at different positions depending upon the amount standing upon the totalizer elements. After this operation the totalizer is disengaged from the operating pinions which will permit the racks to return to their normal positions.

Since the actuators and differential frames are normally locked it is necessary to disable the locking devices before the transmitting racks can be moved rearwardly. In order to produce this result there are pinned to the shaft 37 at intervals, forwardly extending pins 230 (Fig. 7) one for each actuator locking bail 72. When the sub-total lever 177 is forced partially rearward the shaft 37 will be rocked as previously described so that the pins 230 contacting with the upper edges of the bails 72 will disengage the hook members 71 from the projections 70 carried by one of the cam plates of each of the differential frames, it being understood that continued movement of the sub-total lever will retain the actuator locks in their disabled position.

Since the sub-totals which are accumulated may at times exceed the registering capacity of the machine as controlled by the operating keys, it is desirable to provide the sub-totalizer with one or more additional elements beyond the denominations represented by the keys. In the illustrative machine a single totalizer element of a denomination higher than that represented by the amount keys is provided the highest order wheel of the sub-totalizer being designated by reference character 231 (Fig. 11) the pinion connected to which is adapted to mesh with a gear 232 (Fig. 4) attached to a shaft 233. The shaft 233 carries toward its right end a gear 234 meshing with a transmitting rack 235 which is similar to the amount actuating racks 51, 55, 62 and 69. The lower edge of the rack 235 is provided with teeth which mesh with a segmental rack 236 (Fig. 18) loosely mounted upon the segment shaft 49. It will be noted in the figure last mentioned that located in front of the segmental racks 50, 54, 61, 68 and 236, there is a transverse rod 237 which is hung by arms 238 pinned to the shaft 209. (See also Fig. 2.) Connected to the shaft 209 is a forwardly extending arm 239 (Fig. 7) to which is connected a link 240 having an elongated slot engaging a stud 241 attached to the sub-total lever 177.

It will be noted, therefore, that the first partial movement of the sub-total lever 177 disables the actuator locks as previously explained after which the stud 241 engaging the rearward end of the slot formed in the link 240 will, through the arm 239 rock the shaft 209 clockwise and since the shaft 237 engages the forward edge of the various segmental racks pivoted upon the shaft 49 it will move the racks rearwardly. Since each rack has a connection to its associated amount differential frame, the latter will all be elevated rocking around the shaft 49 so that the concentric arcuate portions of the slots in the cam plates will co-operate with the rollers 44 of the arms of the keys which are at this time stationary. Just before the sub-total lever reaches its extreme rearward position the racks will have been moved to their rearmost positions and when the racks become stationary a shouldered portion 242 (Fig. 7) formed on the rearward edge of the sub-total lever 177 will contact with a stud 243 which connects the bell-crank 127 and the link 126. As the bell-crank 127 is rocked counter-clockwise a stud 244 carried thereby will be caught by a spring-urged latching member 245 and since the link 126 will have drawn the sub-totalizer pinions into mesh with the operating gears 75 and 232 which are at this time stationary, the sub-totalizer pinions will remain in mesh with these gears during the return forward movement of the sub-total lever 177. As the sub-total lever 177 is returned the rod 237 will also move forwardly permitting the weight of the differential frames as well as a spring 246 (Fig. 2) connected to each of the rack segments 50, 54, 61, 68 and 236 to drive the transmitting racks forwardly and through the operating gears 75 and 232 to reversely rotate the totalizer pinions and wheels. In the event that one of the totalizer wheels should stand at the "2" position, for example, at the time it is engaged with its operating gear, the associated transmitting rack will be permitted to move forwardly two steps thus reversely rotating the totalizer element until the wheel and therefore the rack are stopped by the engagement of a transfer tripping projection with a portion of the transfer mechanism as will be described more in detail hereinafter. In general, in whatever position a totalizer element may have been standing at the time it is engaged with the operating pinions 75 the associated transmitting rack will be permitted to be moved forwardly a corresponding number of spaces and in this manner each of the totalizer pinions is reversely rotated to its zero position.

At a certain point in the return movement of the sub-total lever 177 a pin 2461 (Fig. 7) carried by the rearward extension of the arm 208 will contact with a forward extension 247 of the latching member 245, thereby disengaging the hooked portion of the latching member from the stud 244 and permitting a spring 248 connected to the link 126 to draw the totalizer pinions out of engagement with the operating gears 75 and 232 and since the actuating segments and racks will then be unlocked the weight of the differential frames as well as the force of springs 246 will, through the segmental racks 54, 50, 61, 68 and 236 drive the associated transmitting racks idly to their normal positions wherein the parts are in position to accumulate items pertaining to a subsequent sale.

*Slip printing mechanism*

In some types of transactions it is desirable to print upon an inserted slip instead of an issued check and in the illustrative machine in order to adapt the machine for slip printing there is provided a control lever 250 (Fig. 1) which may be adjusted from a position designated as "Check" to another position designated as "Slip".

The control lever 250 which extends through the cabinet of the machine so as to be exteriorly adjustable is loosely pivoted upon a stub shaft 251 (Figs. 11 and 12) and is provided at its lower end with rack teeth 252 meshing with the upper end of a segmental rack 253, which segment is attached to the shaft 151. Connected to the shaft 151 is an upwardly extending arm 254 (Fig. 7) bifurcated at its upper end to engage a pin 255 carried by the plate 80 of the check table. When the machine is to be used for printing upon a sales slip the control lever 250 is moved rearwardly to the "Slip" position and through the segmental rack 253 the shaft 151 will be rocked clockwise (Fig. 7) and by means of the arm 254 engaging the stud 255 on the plate 80, the check table will be moved forwardly and since the leaf spring 86 insures that the check paper moves with the check table the end of the check strip will be shifted from the tearing point 179 to a position forward of a line joining the pivots for roller 103 and shaft 107 respectively. The purpose for so moving the check paper is to be able to print the sub-total upon the inserted slip without effecting any feeding operation of the check paper.

The sales slips which are to be printed upon are inserted in a slot 256 provided by plates 257 which are connected together at the edges in such a way as to form a passage-way between. The sales slips to be printed upon are inserted before the amount keys are depressed and after each item is printed upon the inserted slip the sales slip is fed an increment so as to suitably space the printed items. The manner in which this and sub-total printing operations are effected is similar to that described in connection with item printing upon the check strip, the same mechanisms being effective for this purpose, and, therefore, the explanations of these operations will not be repeated.

In sales slip printing operations it is desirable not to print the number standing upon the consecutive numbering wheels as the latter are intended to be used only in connection with the issued checks. The mechanism whereby the consecutive number impression hammer may be thrown out of operation when the machine is adapted for sales slip printing is best shown in F'gs. 6 and 8. The disabling of the consecutive numbering hammer 165 is effected by movement of the rubber impression block upwardly far enough to carry the stud 166 (Fig. 6) out of engagement with the co-acting portion of the operating bell-crank 167 and holding it in this position. With this in view the consecutive numbering hammer head is provided with a stud 258 which is adapted to co-operate with a hook of a member 259 (Fig. 8) integral with the plate 80. When the check table is moved forwardly for slip printing operations the hook of the member 259 will engage the stud 258 thereby elevating the hammer 165 slightly and holding the stud 166 out of operative relationship with the upper arm of the operating bell-crank 167 so that the consecutive number hammer will not be operated. With the exception just noted the manner in which printing is effected upon sales slips is substantially identical with printing upon issued checks.

Associated with the operating mechanism for the consecutive numbering type carriers are devices whereby when the machine is conditioned for printing upon slips movement of the control lever 250 will disable the consecutive number operating devices even though the sub-total lever 177 is operated. As best shown in Fig. 6 the control lever 250 is provided with a pin 260 which works in a slot formed in the frame member 23 and is adapted to engage a concentric notch formed in the arm 196 (Fig. 12). When the control lever is moved to the "Slip" position the stud 260 will engage the notch 261 thereby holding the arm 196 stationary. When the sub-total lever 177 is given a forward and then a return movement the operating arm 198 will be oscillated in a manner previously described, but since the arm 196 is rigidly held the spring 197 cannot move the arm 196 to add a unit to the numbering type carriers and in this operation the spring 197 will be merely stretched and then permitted to return to its normal position.

As will be observed in Fig. 7 the arm 254 extends rearwardly and is provided with notches 450 and 451. When the check lever 250 is in the "Check" position in which position it is shown in Fig. 7, and when the first item is entered in the machine the pin 452 which connects the extension 191 with the bell-crank 189 will pass into the notch 450 thereby locking the control lever 250 and preventing its adjustment out of the "Check" position during successive item entering operations and until after the sub-total has been printed. It will also be observed that when the control lever 250 is moved to the "Slip" position and the first item is printed upon the slip the pin 452 will, in this instance, enter the notch 451 whereby locking the control lever in the "Slip" position during successive item printing operations on the slip, and until after the sub-total lever 177 has been operated. As previously stated when the sub-total lever reaches its extreme rearward position, the frame 102 will be rocked downwardly withdrawing the pin 452 from co-operative relationship with either the notch 450 or 451 and permitting the control lever to be adjusted to either the "Slip" or "Check" position depending upon the kind of printing that the machine is intended to perform during the next series of item entering operations.

*Record strip printing mechanism*

The illustrative machine is also provided with a mechanism whereby the sub-totals and special characters printed upon the check or slip may also be printed upon a record strip contained in the machine, and provision is also made whereby more extended entries in the form of written notations may be made in juxtaposition to the printed items. As will be described hereinafter suitable manipulative devices are also provided whereby auxiliary numbers or symbols may be printed upon the record strip.

Figure 9:
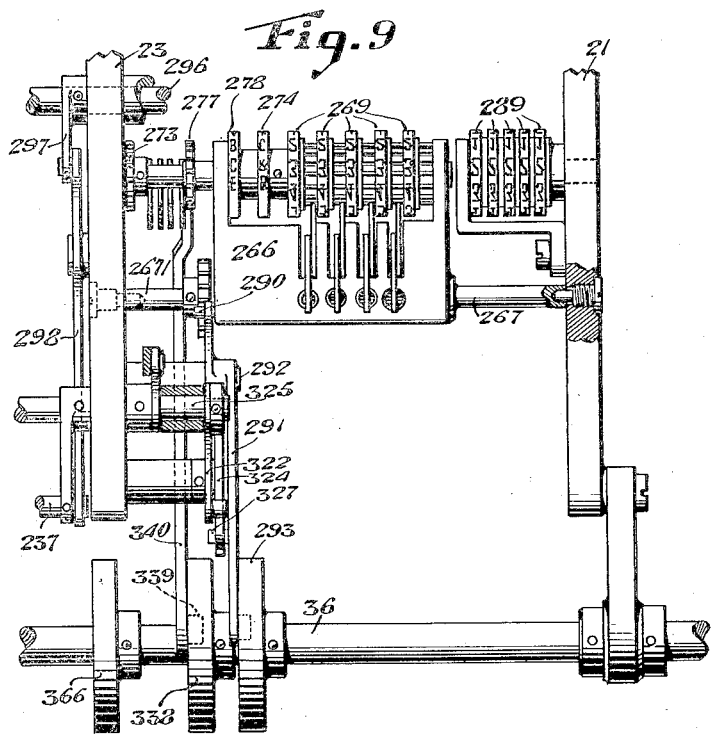
Fig. 9 is a view in front elevation of the accounting mechanism associated with the record printing devices and shows particularly the arrangement of the amount and character printing type carriers and the type carriers associated with the ledger devices.

The auxiliary sub-totalizer for printing the sub-totals upon the record strip is designated by reference character 266 (Fig. 9) and is pivoted at its lower end by a pair of pivot shafts 267 and 2671 journaled in frames 21 and 23. As shown in Fig. 4, meshing with the racks 55, 51, 62, 69 and 235 are gears 2670 which have a shaft and sleeve connection to a corresponding number of gears 268 adapted to engage with the totalizer pinions attached to the sub-total printing elements 269.

In order to adjust a type carrier to print a symbol denoting the type of transaction entered in the machine, the gear 156 (Fig. 15) is secured to a sleeve 270 which extends to the right and has secured to it at one end a gear 271 (Fig. 19) meshing with teeth formed on the lower arm of a bell-crank segment 272 loosely pivoted upon the shaft 2671 which, it will be remembered, is one of the pivotal shafts of the sub-totalizer 266. The upper arm of the bell-crank is provided with teeth meshing with a gear 273 (Fig. 4) which is connected by a short shaft to a transaction type carrier 274.

Similarly the shaft 144 (Fig. 3) which is differentially positioned under the control of the clerk's differential mechanism has attached thereto at one end a gear 275 which meshes with a bell-crank segment 276 (Fig. 19) which, in turn meshes with a gear 277 (Figs. 4 and 9) which is connected by a short sleeve to a clerk's type carrier 278. By reason of the construction just described, it will be noted that an operation of one of the clerk's transaction keys will differentially adjust the associated type carrier for printing the desired character upon the record strip.

It is desirable at times to print on the record strip certain numbers designating, for example, stock numbers or characters which have some particular significance depending upon the type of business in which the machine is used, and to this end the illustrative machine is provided with a series of adjustable levers 279 (Fig. 1) which are adapted to be exteriorly manipulated and adjustable to positions determined by a scale 280. The setting devices 279 are each pivoted upon a shaft 281 (Fig. 2) each having integral therewith a segment 282 meshing with its related segment 283. Each of the segments 283 is connected by means of a shaft or sleeve 284 to a similar set of segments 285 (Fig. 20) each of which meshes with teeth formed on the lower end of a corresponding adjusting rack 286. The racks 286 mesh with gears 287 (Fig. 4) which have a sleeve connection to a similar set of gears 288 which in turn mesh with pinions attached to the number printing type carriers 289 which are in alignment with the sub-total printing elements 269, transaction printing element 274 and the clerk's printing element 278.

In order to mesh the totalizer pinions of the sub-totalizer 266 with the actuating gear wheels 268 the frame 266 (Fig. 19) is provided with a pin 290 adapted to co-operate with a slot formed in one arm of a bell-crank 291 loose on a shaft 292. The downwardly extending arm of the bell-crank 291 carries a roller adapted to co-operate with a box cam 293 attached to the driving shaft 36. The totalizer pinions are normally out of co-operative relationship with their associated operating gears 268, but when movement of the driving shaft 36 begins the box cam 293 will rock the bell-crank 291 clockwise and by its engagement with the stud 290 will rock the sub-totalizer about its pivotal point 267 thereby engaging the totalizer pinions with their operating gears. After this engagement is effected the sub-totalizer elements will be differentially actuated after which time the totalizer pinions and operating gears will again be disengaged, it being understood that the race of the box cam 293 is so designed as to effect this result. In this manner the items which are entered in the sub-totalizer 122 associated with the check printing devices are simultaneously entered in the sub-totalizer 266 associated with the record strip printing devices.

In order to print the sub-total on the record strip there is provided a pivoted platen 294 carrying a rubber impression block 295 the impression block being of a width sufficient to extend over the series of type carriers previously described. The platen 294 is secured to a shaft 296 the latter having secured to it a downwardly extending arm 297 (Figs. 2 and 9) having a pin and slot connection to a pivoted bell-crank 298 which is provided with a cam slot 299 engaging a portion of the rod 237. When the rod 237 is moved rearwardly and upwardly in sub-totaling operations as previously described, its co-operation with the cam slot 299 will rock the bell-crank 298 clockwise and through the arm 297 the shaft 296 will force the rubber impression block against the type printing elements to effect a printing impression upon a record strip 300 which passes around the platen 295.

The record strip supporting means comprises a supply roller 301 (Fig. 19) from which the record strip is drawn over a roller 302, a pair of rollers 303 then rearwardly under and around the rubber impression block 295, then again forwardly over rollers 304, 305 and 306 and then to a storage roll 307. Attached to the storage roll 307 is a ratchet wheel 308 co-operating with a feeding pawl 309 attached to a triple-armed member 310. The rearward arm of this member has a pin and slot connection to a bell-crank 311 which is connected by a link 312 to an arm 313 attached to the shaft 209. It will be recalled that the shaft 209 in sub-totaling operations is first rocked clockwise and then counter-clockwise. During the counter-clockwise movement of the shaft 209 the feeding pawl 309 will give an increment of movement to the record strip so as to suitably space the sub-totals printed thereon.

An inking ribbon 314 (Fig. 19) passes over the printing elements associated with the record strip printing devices and over a felt inking roller 315 as well as over suitable guiding rollers. The felt inking roller has attached thereto a ratchet wheel 316 co-operating with a feeding pawl 317 carried by a bell-crank 318 which has a pin and slot connection to the upper arm of the triple-armed member 310. Therefore, it will be noted that the shaft 209, through the link 312 and the train of mechanism just described is also adapted to give a step of movement to the inking ribbon during each sub-total printing operation.

The manner in which printing appears on the record strip of the illustrative machine is best shown in Fig. 1. The sub-totals, after they are printed upon the record strip are immediately drawn into view by the paper feeding mechanism above described so that written notations may also be made upon the record strip 300. The glass 319 which covers the record strip is provided with a writing slot 320 through which the written notations may be made. In order to provide a suitable writing surface, over the rubber impression block 295 there is provided a flat plate 321 (Fig. 19) attached to the platen 294.

After a sub-total has been printed it is desirable to reset the totalizer elements and the manner in which this is performed is similar in principle and operation to that described in connection with resetting the sub-totalizer associated with the check printing devices, the racks being moved idly to their rearmost positions after which the sub-total pinions are engaged with their associated operating gears. The totalizer elements then control the operating racks in their movement in the opposite direction and permit them to assume positions commensurate with the value which has previously been standing on the totalizer elements. It should be understood that the two sub-totalizers which will simultaneously control the positioning of the differential frames and connected racks will always carry the same amounts and, therefore, will tend to stop the racks at the same point. The mechanism for bringing the sub-totalizer elements 269 into mesh with the gears 268 at the proper time to effect this control will now be described.

Attached to the shaft 209 is an arm 322 (Fig. 19) carrying a roller 323 in the plane of a jaw-shaped member 324 loosely mounted on a stub shaft 325. The member 324 extends rearwardly and is provided with a cam slot 326 engaging a stud 327 attached to the bell-crank 291. When the shaft 209 is rocked clockwise, as in sub-totaling operations, the roller 323 will strike the upper jaw of the member 324 toward the end of the rearward movement of lever 177 thereby rocking the member counter-clockwise and through the cam slot 326 engaging the pin 327 will rock the bell-crank 291 clockwise just as if it had been rocked by the cam 293, thereby engaging the totalizer pinions with their associated operating gears 268. This engaging action takes place at substantially the time the racks 51, 55, 62, 69 and 235 are stationary but at their rearmost position. When the shaft 209 begins its counter-clockwise movement (co-incident with the return movement of the check issuing lever) the arm 322 will be moved downwardly and at a certain point in its movement the roller 323 will co-operate with the other jaw of the member 324 and raise the cam slot 326 so as to allow the bell-crank 291 to rock counter-clockwise and thus disengage the pinions of the sub-totalizer 266 from engagement with the operating gears 268. This disengaging action takes place at substantially the same time that the sub-totalizer 122 associated with the check printing devices is disengaged. In order to hold the member 324 in its shifted position when the roller 323 moves away from either jaw there is provided a spring-pressed aligning pawl 324I adapted to engage notches formed in the member 324 and which correspond to the two positions that the member 324 may assume.

Therefore, it will be noted that not only do the sub-totalizers receive precisely the same entries but they are reset simultaneously so that they may again individually accumulate the same items pertaining to a subsequent sale.

*Multiple totalizers*

The present machine is provided with a plurality of totalizers for keeping a classified record of the transactions handled by the various clerks.

The totalizers and their associated operating mechanism are substantially alike in all respects and a description of one will suffice for all. The frame of each of the clerk's totalizers is designated by reference character 330, (Fig. 19) the series of totalizers being arranged in a substantially horizontal plane, and each is pivoted in a manner similar to that described in connection with the sub-totalizer 266, by a shaft 331 (Figs. 5 and 19) journaled in the left intermediate frame 23 at one end, and at the other by a shaft journaled in the frame 21 (Fig. 4) and passing into the totalizer frame. Since the journal shafts are in axial alignment the totalizer frames may be oscillated bodily about these shafts as a center to bring their totalizer pinions 332 (Fig. 4) into engagement with their operating pinions 333. The operating pinions 333 have shaft and sleeve connections 334 with a similar set of gears 335 in continuous engagement with the teeth of the actuating racks, 51, 55, 62 and 69. Each totalizer pinion has rigidly secured thereto a printing type carrier 336, the series of type carriers and totalizer pinions being loosely pivoted upon a shaft 337 carried by its related totalizer frame 330.

The totalizer engaging mechanism is adapted to move the pinions of the selected totalizer into engagement with the operating pinions 333 so that they are in engagement during the depression of the keys after which they are disengaged therefrom either at the extreme end of the downstroke or at the first part of the upstroke of the keys, so that the totalizer wheels and actuators remain disengaged during the time the keys are returned to their normal positions.

In the illustrative embodiment while a clerk's key is being depressed to the coupling point the main drive shaft 36 will be partially operated to operate certain mechanism which will tend to effect the engagement of the four totalizers with the operating pinions. It is, of course, undesirable that the four totalizers be actuated at one time and to this end other mechanism which is under the control of the operated clerk's key will come into play to disengage the totalizers which are not appurtenant to the clerk's key that is being depressed, with the net result that only one totalizer is engaged with the operating pinions to be operated thereby during an operation of the machine. Mechanism for effecting the above will now be described.

Fixed to the drive shaft 36 is a box cam 338 (Figs. 5 and 9) the race of which engages a roller 339 carried by the lower arm 340 of a bell-crank member comprised by the arms 340, 341. The bell-crank member is loosely pivoted on the shaft 144, its upper arm 341 carrying a stud 342 (Fig. 5) upon which are loosely mounted a series of cam plates 343 each provided with a cam slot 344 in engagement with a stud 345 carried by a related totalizer engaging slide 346. Each of the slides 346 is provided with an upward projection 347 bifurcated to receive the totalizer wheel supporting shaft 337 of its related totalizer. It will be obvious by the construction just described that when the desired slide 346 is moved forwardly its engagement with the totalizer wheel supporting shaft 337 will rock the desired totalizer about its pivotal point 331 thereby engaging the totalizer pinions with the then stationary operating pinions.

The result of the above construction is that whenever a clerk's key is depressed to the coupling point the drive shaft 36 will be partially rotated and through the cam 338 it will impart a clockwise rocking movement to the bell-crank 340, 341, which by virtue of the pin and slot connection 344 and 345 with the totalizer engaging slides 346 will tend to move all of the slides forwardly to rock all the totalizer frames 330 about their respective pivotal points and thus bring the totalizer pinions into engagement with the operating pinions and retain the same in such engagement during further depression of the keys in order to accumulate the items entered in the machine.

Figure 35:
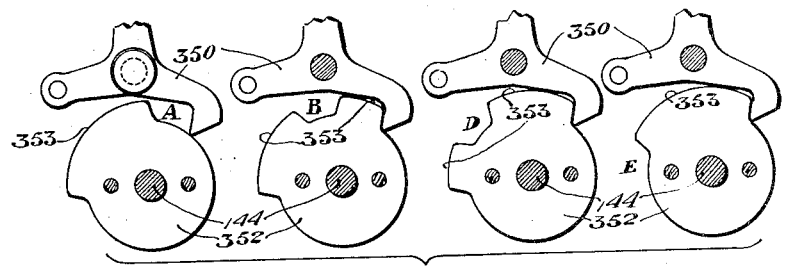
Fig. 35 is a collective view of the different totalizer throwout cam plates.

In order to prevent the engagement of the undesired totalizers so that only a single totalizer will be actuated during an operation of the machine each of the cam plates 343 is provided with a downward extension 348 provided with a pin engaging a bifurcation formed in a related bell-crank member 349, 350 a series of which is loosely pivoted upon the upper arm 341 of the bell-crank by a stud 351. Each arm 350 of the bell-crank 349, 350 is in the plane of an associated throw-out cam disk 352. In the illustrative machine four (Fig. 35) of these cam disks are provided and each is provided with a high portion 353 of a cam formation all the disks 352 being connected together for unitary movement since each is rigidly secured to the shaft 144 which, it will be remembered is differentially positioned by the clerk's differential mechanism.

When a clerk's key is operated all the cam disks 352 will be rotated differentially and since the high or cam portions 353 of the disks are in staggered relation the result of this is that the arms 350 of three of the bell-crank members 349, 350 will be cammed by the high portions 353 rocking these bell-cranks counter-clockwise and rocking their associated bell-cranks 343 clockwise so that through the cam slots 344 engaging the pins 345 there will be a tendency to draw the associated totalizer engaging slides 346 rearwardly thus nullifying the tendency of a forward movement of these three of the slides 346 by the arm 341. The result of this is that three of the totalizer engaging slides 346 will actually receive no movement or will receive substantially equal movements in opposite directions and therefore will be ineffective to engage the pinions of their related totalizers with the associated operating gears.

Since the arm 350 of one of the bell-cranks 349, 350 engages the concentric or low portion of the cam disk 352 this bell-crank will not be rocked and the associated cam arm 343 will remain in substantially the position shown in the drawings so that as the arm 341 is rocked forwardly it will move the desired totalizer slide 346 forwardly thus engaging the related totalizer pinions with the operating pinions. Rocking of the totalizer about its pivotal point to effect the desired engagement and disengagement is then placed under the control of the cam 338.

As previously explained after a clerk's key has been operated the clerk's differential mechanism will be retained in the position to which it has been adjusted until a sub-total has been printed. This, of course, will retain the cam disks 352 in their differentially moved positions while the item keys are subsequently operated to insert the items successively. The bell-crank arms 349, 350 and cam arms 343 will then also be retained in the desired positions so that the same totalizer will be engaged during a series of succcessive item entering operations. It will be understood that while the arms 350 rest upon either the high portions 353 or the lower normal peripheries of the disks 352 the reciprocating movement of the bell-crank 341 will cause the arms 350 to slide back and forth upon the contacting surface and for this reason the high and low portions of the disks are so formed as to permit this sliding movement without causing the bell-cranks to be rocked on their pivots.

In certain types of transactions which do not involve the receipt of cash, it is desirable to prevent the engagement of even the selected clerk's totalizer. To produce this result those transaction keys 30 which are intended to prevent the engagement of the selected totalizer are each provided with a pin 354 engaging with a cam slot 355 of a cam plate 356 loosely mounted upon the shaft 36. Each cam plate 356 has a pin and slot connection to an arm 357 attached to a transverse shaft 358 (Figs. 3 and 5). Also secured to the shaft 358 toward its right end are rearwardly extending arms 359 to which are pivoted a series of links 360, the illustrative machine being provided with four of such arms and links, each of the latter having a slotted connection to a stud 361 carried by a rearward extension 362 of its associated bell-crank 349, 350. When the arms 362 are rocked downwardly by means of the cam portions 353, the associated pins 361 will engage the lower ends of the slots formed in the links 360. However, it will be recalled that at the time of depression of a transaction key there will be one bell-crank 349, 350 which has not been moved from its normal position, so that this particular one will have the stud 361 of its arm in engagement with the upper end of the slot in the related link 360.

When a key 30 which is to prevent engagement of the totalizer is operated after a clerk's key (there being in the illustrative machine two of such transaction keys, i. e. "Paid out", and "Charge"), depression of this key will rock the related cam plate 356 clockwise thereby drawing the links 360 downwardly and since the upper end of the slot formed in one of these links is in engagement with the stud 361 of the only arm 362 which has not been moved downwardly, it will rock the associated bell-crank 349, 350 counter-clockwise and through the cam slot 344 will draw rearwardly the totalizer engaging slide 346 which has previously been moved forwardly to effect engagement of the totalizer pinions with the operating gears. This, of course, will effect disengagement of the totalizer pinions from the operating pinions so that none of the totalizers will be actuated.

Additional mechanism is also provided whereby the totalizer throwout mechanism will be held in its operative position during a series of item entering operations. This eliminates the necessity of successively depressing a transaction throwout key and makes the machine simpler and easier to operate and reduces the liability to error since without this mechanism the operator might forget to operate the desired transaction key each time.

Rigidly secured to the transaction differential frame 154 is a series of downwardly extending plates 3551 (Fig. 8) one for each cam plate 356 the latter being provided with forward extensions 3552 (Fig. 5) carrying lugs 3553 each lug being in the plane of its associated plate 3551.

It will be noted that the plate 3551 is provided with a shoulder 3554 the cut in the plate being of such dimension that when the transaction differential frame 154 is elevated one or two steps (corresponding to depressions of the "Received on account" and "No sale" keys) the horizontal edge forming the shoulder 3554 will merely ride over the lug 3553. However, when either the "Charge" or "Paid out" keys are depressed the frame 154 will be lifted a greater amount and simultaneously the pin 354 of the depressed key will work in the slot 355 of the plate 356 drawing the lug 3553 away from the plate 3551. It will be remembered that when the depressed key is returned the differential frame will be held in elevated position so that upon the return movement of the plate 356 the lug 3553 will contact and rest against the edge 3555 of the plate 3551 thus holding the cam plate 356 in its moved position and the totalizer throwout mechanism in its effective condition. The return of the depressed transaction key to its normal position, will, however, be permitted, the cam slot 355 being suitably opened at its lower end to permit this.

After a sub-total has been taken the frame 154 is unlocked and restored to normal and this will allow the cam plate 356 to return to its normal position since the edge 3555 will be drawn out of contact with the lug 3553 of the operated cam plate.

*Transfer mechanism*

The illustrative machine is provided with a suitable transfer mechanism for each totalizer so that when any wheel passes from nine to zero, a unit will be transferred to the wheel of the next higher order. The mechanisms for effecting transfers between successive denominational orders are alike and in view of this fact the transfer mechanism between the units and tens order of one totalizer only will be described. With the exception of the rack for operating the various transfer shafts the transfer mechanism forms a self-contained unit and is carried by the totalizer frame.

In order to provide connections from the main shaft for driving certain elements of the transfer mechanism there is loosely mounted upon the shaft 358 (Fig. 2) a curved arm 364 which carries a roller 365 engaging the race of a box cam 366 attached to the driving shaft 36. The forward end of the curved arm 364 is provided with a stud 367 engaging a bifurcation of an extension of a segment 368 loosely pivoted upon the shaft 49. The teeth of the segment 368 mesh with a pinion 369 attached to a shaft 370. Also attached to the shaft 370 is a similar pinion 371 (Fig. 5) meshing with the teeth formed on the upper edge of a slidably mounted transfer rack 372.

In order to effect an oscillating movement of the transfer shafts 373 (Fig. 22) of the different totalizers, the shafts are connected to the transfer rack 372 by a train of gears comprising a gear 374 attached to the shaft 373 meshing with a somewhat larger gear 375 loose on the stud shaft 331 which is the pivotal shaft of the clerk's totalizer 330, or on the stud shaft 2671 (Fig. 9) which is the pivot of the record strip sub-totalizer 266.

Figure 34:
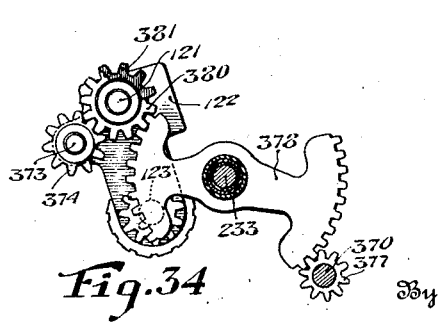
Fig. 34 is a detail view of the transfer actuating devices associated with the record strip totalizer.

In order to actuate the corresponding transfer shaft 373 of the sub-totalizer 122 associated with the check printing devices, the shaft 370 has attached thereto at one end a gear 377 (Figs. 7 and 34) meshing with a bell-crank segment 378 pivoted on one of the sleeves carried by shaft 233 and which meshes with a gear 380 attached to the shaft 121 which, it will be remembered is one of the pivot shafts of the sub-totalizer 122. Also attached to the shaft 121 at its other end is a gear 381 which meshes with the usual gear 374 attached to the transfer operating shaft 373 associated with the sub-totalizer 122.

Considering the construction of a clerk's totalizer each of the total printing wheels is provided with an integral projection 383 (Fig. 23). Journaled in the totalizer supporting frame is a shaft 384 which is a supporting means for most of the elements comprising the transfer devices. Loosely mounted on the shaft 384 is a plurality of transfer members, one of which is shown in perspective in Fig. 27, and as will be observed, it consists of a hexagonally formed member 385, a triangular disk 386 and a second triangular disk 387, the triangular disks 386 and 387 being of different dimensions and being placed at different angles in the transfer unit. The transfer members are so arranged on the shaft 384 that the projections of the triangular disks 387 are in the plane and in the path of movement of the transfer tripping projections 383 and the triangular disks 386 are in the plane of the totalizer pinions attached to the next higher order totalizer wheels. Also journaled in the totalizer supporting frame is a shaft 388 which is parallel to the shafts 373 and 384 and which carries a series of retaining pawls 389 each of which is in the plane of one of the hexagonal retaining members 385. These pawls are aligned with the retaining members 385 and urged towards them by a spring 390. Secured to the shaft 373 is a series of transfer operating disks 391 each of which is in the plane and path of movement of the projections of one of the triangular disks 386, the disks 391 being suitably cut away so as to form a shoulder 392. The cam disks 391 are so formed and positioned as to have their shoulders 392 spirally arranged about the shaft 373 so that in a rotary movement of the shaft 373 these operating shoulders of the disks 391 will come into action successively, first the tens transfer disk, then the hundreds, and then the thousands, etc. It will be noted from Fig. 27A, particularly, that the cut-away portions of the disks are greater in the successive disks toward the left or higher denominations for the purpose of spirally locating the series of shoulders 392.

The sequence of operation of the transfer devices is illustrated in Figs. 23 to 25, inclusive, Fig. 23 showing the normal position of the parts, the totalizer being disengaged from the operating pinions. If, for example, "9" has been standing upon the units totalizer wheel and a unit or more is added thereto during the time that a totalizer pinion is engaged with the operating gears the operating gear in advancing the units pinion and totalizer wheel one step will cause it to pass from its original "9" position to its zero position. The tripping projection 383 will, during this time, engage a projection of the triangular disk 387 and rock the transfer member slightly clockwise from the Fig. 23 position to the Fig. 24 position wherein it will be noted that this partial rotation of the member has brought a point of the triangular disk 386 into the notch formed in the operating disk 391, the operating disk at this time being stationary.

As the totalizer wheel continues its rotary movement it will bring the point of the triangular disk 386 still further into the notch in the disk 391 until the projection 383 passes over the point of the triangular disk 387 at which time another point of the triangular disk 386 will be brought in the path of the totalizer pinions of the tens order wheel. The transfer unit or spool will also be aligned and held temporarily in its adjusted position by the co-action of the spring-pressed pawl 389 with the hexagonal retaining member 385.

The transfer unit is now positioned to advance the tens wheel but this is not effected until the totalizer pinions are disengaged from the operating gears, which, it will be remembered occurs at the end of the down-stroke of the keys, or, if so desired, during the first part of the upstroke. After this disengagement has taken place the rack 372 will be moved rearwardly thereby rocking the shaft 373 of each clerk's totalizer counter-clockwise and since a point of the triangular disk 386 in the plane of the tens order pinion will be in the path of shoulder 392 counterclockwise movement of the shaft 373 will rotate the triangular disk clockwise and since another point of the triangular disk 386 co-operates with the pinion of the tens order wheel clockwise movement of the transfer member will advance the tens order wheel one step. After this has been effected, the shaft 373 will be rocked reversely so that the disk will again assume the position illustrated in Fig. 23. It is to be understood that due to the fact that the shoulders 392 of the various transfer disks 391 are spirally arranged about the shaft 373 the transfers will be effected seriatim.

In actual use, machines of this character may be subjected to improper usage and abuse and to deliberate attempts on the part of the operator to cause them to misfunction or register incorrectly. The keys are frequently operated with considerable force and violence, and under these conditions the different operations of totalizer engaging and disengaging, and transferring is performed in rapid sequence. In this case the totalizer wheel to which a transfer is made may tend to over-rotate, with the result that an incorrect registration would be indicated. To preclude the possibility of such over-carrying and to prevent accidental displacement of the totalizer pinions from their proper positions when disengaged from their operating gears the following devices are provided.

Loosely pivoted upon the shaft 384 and urged by the spring 390 to engage the interdental spaces of the associated totalizer pinion is a pawl 393 which has an extension 394 provided with an edge 395 concentric with respect to the shaft 373. The pawl 393 is in the plane of a projection 396 integral with a circular element which is keyed to the shaft 373 by means of an inwardly projecting tongue. It will be noted in Fig. 25 that if the totalizer pinion associated with the tens order wheel is to be actuated a unit by the transfer devices and if the transfer disk 391 should be actuated rapidly the point of the triangular disk 386 engaging the pinion might impart such a rapid rotation to the totalizer wheel as to cause it to over-carry, but it will be noted that when the point of the triangular disk is rotating the totalizer pinion the spring 390 is urging the upper end of the pawl 393 into co-operation with the interdental spaces of the pinion, and, furthermore, the engagement of the projection 396 with the extension 394 of the pawl will serve to positively engage the latter with the totalizer pinion, thereby locking the latter against over-throw due to momentum.

From the foregoing description it will be evident that during each operation of the machine the transfer shafts 373 of all of the clerk's totalizers as well as the sub-totalizers are actuated irrespective of whether the transfers are to be effected. When no transfers are to take place in the totalizers, none of the points of the triangular disks 386 will be rocked into engagement with the notches or cut-away portions formed in the operating disks 391 but the latter will nevertheless be given an oscillating movement which will be idle. Since the outer concentric portions of the disks 391 normally engage the straight edges of the triangular disks 386 they will lock the associated transfer spools and prevent them from being turned accidentally.

As previously explained the totalizer elements of the sub-totalizers are reset by first positively moving the actuating racks rearwardly, then engaging the sub-totalizer pinions with the associated operating gears and by permitting the actuating racks to be reversely moved until stopped so that they will, through the operating pinions, reversely rotate the totalizer elements, the position at which each operating rack will be stopped depending upon the amount previously standing on the associated totalizer wheel.

Adding in the totalizer elements is performed in a counter-clockwise direction, but the resetting operation is performed in a reverse direction, that is, clockwise. When each totalizer element is rotated in a clockwise direction the transfer tripping projection 383 will, at the end of the rotative movement of the totalizer wheel to zero position come into contact with one of the points of the triangular disk 387 and will tend to rotate the transfer member counter-clockwise, but since one of the points of the triangular disk 386 is normally opposite the concentric high portion of the cam disk 391, which is at this time stationary, it will prevent movement of the totalizer wheel past the zero position. In this manner each totalizer pinion controls the movement of the operating gears and, therefore, the actuating racks during resetting. In order to positively stop the totalizer element associated with the wheel of the highest order for which no transfer member is provided, there is loosely mounted upon the shaft 373 an irregularly shaped member 397 (Fig. 26) which is provided with a projection 398 and also a shoulder 399 engaging a portion of the shaft 384. As the wheel of the highest order is reversely rotated its transfer tripping projection 383 will co-operate with the projection 398 and by such engagement this wheel will be prevented from being moved beyond its zero position during the resetting operation, since the tendency to rotate the member 397 counter-clockwise will be resisted by the shoulder 399, and the line of force from the projection 383 will be substantially radial to the shaft 373 or will pass above it.

While the above described transfer mechanism is satisfactory in performance it is to be understood that this is merely one embodiment of the invention and that other forms might be used with similar results. Figs. 28 to 32, inclusive, illustrate another form of transfer mechanism which has been found satisfactory.

In this instance the transfer rack 372 (Fig. 28) is adapted to drive a gear 401 meshing with a pinion 402 attached to the transfer shaft 403.

Secured to each of the total printing wheels 336 (Fig. 29) is a disk 404 (Fig. 29) provided with a tripping projection 405 (Fig. 30). Journaled in the totalizer supporting frame is a shaft 406 which is the supporting means for certain of the elements comprising the transfer devices. Loosely mounted upon the shaft 406 is a series of transfer members, one of which is shown in perspective in Fig. 32, and as will be observed it consists of a triangular formed member 407 and a star wheel 408, both of which are connected together for unitary movement by a sleeve 409. As will be noted in Fig. 29 the triangular disk 407 is in the path of the tripping projection 405 while the star wheel 408 is in the plane of the totalizer pinion of the next higher order wheel.

Also journaled in the totalizer supporting frame is a shaft 410 which is adapted to carry a plurality of aligning and retaining pawls which are mounted in pairs, and as shown in Fig. 30, one pair comprises a spring-pressed pawl 411 mounted adjacent a retaining pawl 412. The pawl 412 is in the plane of and co-operates with the teeth of the star wheel 408, while the retaining pawl 411 is urged by a spring 413 so that its upper end 414 which is bent will likewise be urged so as to co-operate with one of the teeth of the star wheel 408. A coil spring 415 wound around the shaft 410 urges the pawl 412 upwardly, by engagement with the forward edge of a downwardly extending arm, to co-operate with the teeth of the star wheel and, as shown, the pawl 412 is provided with a shoulder 416 normally engaging one of the teeth of the star wheel 408.

Secured to the shaft 403 are a series of transfer operating disks 417 each being suitably cut so as to provide a shoulder 418. The cam disks 417 are so constructed and arranged around the shaft 403 that the shoulders 418 are spirally located and during an oscillatory movement of the shaft 403 the shoulders of the operating disks 417 will be brought successively into action, first, that of the tens transfer disk, then the hundreds, then the thousands, etc.

The sequence of operation of the transfer devices is illustrated in Figs. 30 and 31, Fig. 30 showing the normal position of the parts, the totalizer being disengaged from the operating pinions. If, for example, a certain number has been standing upon the units wheel and the latter is actuated sufficiently so that it will pass through the nine position to zero, the tripping projection 405 will, during the time it passes through to the zero position engage a projection of the triangular disk 407 and rock the transfer member slightly clockwise from the position shown in Fig. 30 to the position shown in Fig. 31. In Fig. 30 it will be noted that the transfer member is locked in its normal position by reason of the fact that the bent end 414 of the spring-urged pawl 411 engages one of the teeth of the start wheel 408 while the shoulder 416 of the retaining pawl 412 engages another tooth of the star wheel 408. This locks the transfer member against accidental movement in either direction. At about the time the transfer projection 405 is disengaged from the projection of the triangular disk 407 the transfer member will be rocked sufficiently so that one of the teeth of the star wheel 408 will abut against the point 419 formed on the transfer disk 417 thus locking the transfer member in its cocked position. At this time the retaining pawl 412 will be disengaged from the star wheel so that the coil spring 415 will be effective to rock it upwardly, its movement being stopped by a shoulder integral with the retaining pawl 412 engaging a portion of the totalizer frame. When the transfer member is in the cocked position, as shown in Fig. 31, it will be noted that one of the teeth of the star wheel 408 is positioned just over the shoulder 418 of the transfer disk so that when the transfer shaft 403 is rocked, the engagement of the shoulder 418 with the tooth of the star wheel 408 will rock the transfer spool clockwise and since another point of the star wheel 408 will then engage the pinion of the tens order wheel clockwise movement of the transfer member will advance the tens order wheel one step, and after this has been effected, the shaft 403 will be rocked reversely so that the disk will again assume the position illustrated in Fig. 30. At this time it will be noted that the transfer member 408 has been rocked sufficiently so that it will again be held by the retaining pawls 411 and 412.

To preclude the possibility of over-carrying and to prevent accidental displacement of the totalizer pinions from their proper positions when disengaged from their operating gears there is provided an aligning pawl 420 for each pinion adapted to be urged by the spring 413 so that its upper end engages the interdental spaces of the totalizer pinion. The pawl 420 is provided with a rearward extension 421 which is in the plane and path of a camming projection 422 attached to the shaft 403. It will be observed that when one of the teeth of the star wheel 408 leaves the tooth of the pinion which is being advanced a unit, the camming projection 422 will engage the extension 421 thereby positively rocking the upper end of the pawl 420 into engagement with the totalizer pinion and locking the latter against overthrow due to momentum.

In order to provide a positive stop during resetting for the totalizer element associated with the highest order wheel for which no transfer member is provided, there is loosely mounted upon the shaft 403 an irregular shaped member 423 (Fig. 33) which is provided with a projection 424 adapted to co-operate with the transfer tripping projection 405. It will be understood that when the highest order wheel is turned clockwise to its zero position the engagement of the tripping projection with the projection 424 will prevent any movement of the wheel beyond its zero position.

Total printing mechanism

In cash registers the total of the sales registered and other information is usually obtained by reading the amount standing upon the totalizer elements and other registering devices. It is preferable, however, to have this information printed upon a record bearing material as it then forms a permanent and unchangeable record which may be referred to at any time. For this reason the illustrative machine is provided with a simple and effective total printing mechanism for printing upon the record strip the amounts accumulated by the various totalizers.

Referring to Fig. 19, it will be noted that the record strip 300 also passes over the clerk's totalizers 330, the totalizer elements of which are formed with raised printing characters. The inking ribbon 314 likewise passes over the clerk's totalizers but beneath the record strip so that the ribbon is located between the total printing elements and the record strip. Journaled between the frames 21 and 23 by shafts 500 are total printing platens 501 which are carried by a frame attached to the shaft 500. It will be noted that the platens are in pairs and each platen overlies the printing type of its respective printing totalizer. Attached to the shafts 500 are arms 502 (Figs. 2 and 4) and 503 which are connected together by a pin 504 carried by the arm 503 engaging a bifurcation formed in the end of the arm 502. Loosely pivoted upon a stub shaft 506 is a total printing lever 505 which, as shown in Fig. 1 projects through the machine cabinet so as to be exteriorly operable. The upper portion of the total printing lever 505 is provided with a double cam slot 507 engaging the stud 504. As will be observed in Fig. 1 there is attached to the cabinet cover a scale bearing at one end the characters "B—D" and at the other end characters "A—E". When it is desired to effect a printing impression from the clerk's totalizers "B" and "D", the total printing lever 505 is moved rearwardly and by means of the forward portion of the cam slot 507 it will rock the pivot stud 504 downwardly thereby rocking the inner platens 501 downwardly to effect a printing impression from the associated totalizers upon the record strip. When the total printing lever 505 is moved forwardly it will rock the outer platens 501 downwardly, thereby effecting a printing impression from the remaining totalizers upon the record strip.

After the total printing impression has been effected it is desirable to feed the record strip in order that the printed totals may be brought to view and for this purpose, as will be seen in Fig. 20, the paper is attached to the storage roll by the usual retaining key 508 which is in alignment with a spring-urged knob 509 (Fig. 4) which is provided with a slot 510 adapted to co-operate with the paper retaining key 508. By rotating the knob 509 the record strip may be fed as desired, either for the purpose of bringing the total printing into view or to give the record strip an auxiliary feed when more extended autographic notations than that permitted by the writing slot are to be entered. If so desired, autographic notations may be made identifying each totalizer or the totalizer frames may be formed with a special character to print a character identifying the totalizer.

Resetting devices

At the termination of a day's business or any arbitrary period it is desirable after the totals have been obtained from the various totalizers that the various registering elements be returned to zero prior to the registration of the sales accumulated during a subsequent period. To this end each totalizer is provided with a manipulative device which is adapted to reset the totalizer elements to their zero positions.

For this purpose each totalizer wheel supporting shaft 337 extends outwardly through apertures formed in the frame 21 (Fig. 4) and is provided at its end with a knurled knob 515. As best shown in Fig. 26 each of the totalizer elements 336 carries a pivoted pawl 516 which is spring-pressed against the shaft 337. Each shaft 337 is provided with a series of notches 517 one for each wheel of the totalizer. When the wheels are turned in the registering operation of the machine the pawls 516 will slip idly over the shaft 337 due to the fact that the pawls are normally out of the plane of the associated notches 517. However, when resetting is to be performed the shaft 337 is first shifted laterally by means of the knob 515 so as to bring the notches and pawls into co-operative relationship and then the shaft is turned by means of the knurled knob so that the abrupt wall of each notch will contact with the end of its pawl 516 and pick up the totalizer element in whatever position it may be standing at the beginning of the movement of the shaft and carry it around with the shaft, and in this way nearly a complete revolution of the shaft in the proper direction will serve to reset the totalizer elements to zero or initial position in the opposite direction from that of adding. This method of resetting is well known in the art and is a common expedient found in cash registers. It will be understood, of course, that the resetting devices just described are provided only for the clerk's totalizers 330, since the resetting means for the sub-totalizers has already been explained.

*Precautionary devices*

The mechanism as thus far described is substantially complete and practically operative, but some devices which may be called precautionary devices are desirable to prevent any fraudulent operations of the machine.

Hinged to the cabinet 25 at its rear end by hinges 520 is a cabinet lid or hood 521 (Fig. 20) which as shown in Fig. 1, is apertured so as to permit viewing of the record strip and is also apertured so that the control lever 250, check issuing lever 177, total printing lever 505, the paper spacing knob 509, and the setting levers 279 associated with the ledger device may project through so as to be exteriorally operable. The cabinet cover 521 conceals the printing mechanisms, as well as the totalizer elements of the clerk's totalizers 330 and the sub-totalizer 266 so that when the hinged cover 521 is raised to replenish the paper supply, inking ribbons, etc., access may be had to the total printing elements. In some instances it would be of particular advantage to an operator to fraudulently manipulate the totalizer, if that could be done, so as to indicate a total less than that actually registered. In order to guard against such mis-operation and others that might be possible additional mechanism is also provided.

Located over the clerk's totalizers 330 and sub-totalizer 266 is a shield 522 (Fig. 19) which is suitably apertured so that the associated printing platens may normally contact with the total printing type carriers. The shield 522 is bent downwardly at one side to form a guiding lug 523 (Fig. 20) overhanging the frame 21, the lug being provided with a guiding slot 524 co-operating with a stud 525 carried by the frame 21. The shield is also formed with guiding slots 518 (Fig. 21) co-operating with studs 519 carried by the frame members 21 and 23.

Attached to the hinged cover 521 is a curved arm 526 (Fig. 20) provided with a stud 527 co-operating with a slot 528 formed in a lug 529 bent up from the shield 522. By reason of the construction just described it will be obvious that when the cover 521 begins its upward movement the stud 527 co-operating with the slot 528 will force the shield forwardly so that an integral portion of the shield 522, instead of an opening, will now be located over each of the totalizers. Since the totalizers will be covered in this way whenever the cover or hood 521 is raised it will not be possible to surreptitiously rotate the elements.

It will also be observed that the resetting knobs 515 are accessible whenever the hinged cover is raised. In order to prevent resetting operations by unauthorized persons the shafts 337 are provided with reduced portions 530 (Fig. 20) which normally co-operate with similar shaped notches 531 formed in a locking plate 532. Attached to the side frame 21 is a lock 533 the barrel of which has connected thereto a cam plate 534 provided with a cam slot 535 engaging a pin 536 carried by the locking plate 532. When the key of the lock 533 is inserted and rotated, the locking plate 532 will be cammed forwardly thus disengaging the notches 531 from the reduced portions of the resetting shafts 337 permitting the knobs 515 to be rotated to reset the totalizer elements.

As will be noted in Fig. 1 the total printing lever 505 is accessible to the operators of the machine, but in order to prevent unauthorized persons from effecting total printing impressions a lock of any suitable pattern may be provided to lock the total printing lever in its normal position.

*General summary of operation*

The nature of the improved mechanism is such that in order to make the foregoing description as clear as possible it has been necessary to state the operation considerably in detail as an incident to explaining the various features of construction. A complete restatement here of the operation is, therefore, believed to be unnecessary. However, a résumé of the general operation of the machine will now be given to coordinate the operation and function of the various parts which have been described in detail.

It will be assumed that the various levers are in their proper positions and each of the totalizers have previously been zeroized so that their elements stand at zero. It will also be assumed that the operator desires to enter a series of items comprising a "Cash" transaction the first item of which is $0.85 and also wishes to issue a check giving a total of the items entered in the machine. In this instance, it is necessary to adjust the control lever 250 (Fig. 1) to the "Check" position if it is not already in that position so that the check table comprising the plates 80 and 81 (Fig. 7) will, by means of the leaf-spring 86, move the check paper to such a position that it is interposed between the feeding rollers 103 and 108.

If it is also desired to print special numbers or characters upon the record strip further identifying the article sold then the various levers 279 (Fig. 1) will be adjusted to their proper positions, but if no such identification is necessary they will be restored to their normal positions wherein all the ledger type elements 289 (Fig. 4) will print a series of zeros when the sub-total is printed upon the record strip.

If the clerk operating the machine should be clerk "A" he will, in this instance, depress his key 31 a partial amount so that the cam edge 38 (Fig. 5) will co-operate with the shoulder 40 to rock the key coupler 32 upwardly and in this position the surface 41 of the key will act against the shoulder of the coupler to arrest further movement of both the key and the coupler. As the key coupler is raised one set of the rack teeth 34 (Fig. 6) meshing with the pinion 35 will drive the shaft 36 counter-clockwise until the key is stopped at which time the shaft will be held in its partially rotated position by the full-stroke mechanism, such as that shown in the Fuller application Ser. No. 263,125 and British patents previously mentioned.

When the drive shaft 36 is partially rotated the cam 338 (Fig. 5) will impart a clockwise movement to the bell-crank 340, 341 and by virtue of the pin and slot connection 344 and 345 with the totalizer engaging slides 346 there will be a tendency to move all the slides forwardly to rock all the totalizer frames 330 about their respective pivotal points and bring the totalizer pinions into engagement with the operating pinions and retain the same in such engagement during a further depression of the keys in order to accumulate the item entered in the machine. Simultaneously, however, the shaft 144 is differentially rotated by means of the clerk's differential mechanism with the result that the cam disks 352 will be rotated differentially so that the high portions 353 of three of the disks will rock their associated bell-cranks 349 counter-clockwise and the connected cam plates 343 clockwise so that through the cam slots 344 engaging the pins 345 the associated totalizer engaging slides 346 will tend to move rearwardly thus nullifying the movement of the bell-crank 340, 341. The result of this is that only one totalizer will have its pinions engaged with the operating pinions which are at this time stationary.

As the clerk's key is operated the associated cam plate 137 will be operated differentially so that its projection 139 will be caught by the latch bail 140 retaining the frame 138 in its differentially moved position. The segment 142 which is attached to the frame 138 meshes with the pinion 143 so that it will drive the shaft 144 differentially to adjust the series of disks 353 just mentioned. The gear 143 (Fig. 15) attached to the shaft 144 will drive the gear 145 and through the shaft 146 and pinion 147 attached thereto will drive the gear 148 differentially. The bell-crank segment 149 (Fig. 6) meshing with the pinion 148 will be differentially positioned and through the bell-crank segment 150 it will differentially adjust the clerk's type carrier 153 (Fig. 11). In this manner the clerk's type carrier associated with the check printing mechanism is adjusted to its proper position. Simultaneously the shaft 144 (Fig. 3) will, through the gear 275 attached to the shaft differentially position the bell-crank segment 276 (Fig. 19) so that through a gear 277 (Fig. 4) it will differentially adjust the clerk's type carrier 278 for the record strip printing mechanism.

It has been assumed that the items entered are those comprising a "Cash" transaction, but if it is desired to record and indicate a transaction other than "Cash" the desired transaction key 30 (Fig. 1) will be operated. As the desired transaction key 30 (Fig. 8) is depressed the associated arm 43 will rock the transaction differential frame 154 so that it will be differentially positioned and latched by means of the latch bail 1561.

As the frame 154 is moved differentially it will, through a segment 155 attached to the frame differentially drive the gear 156 and through a gear 157 (Fig. 15) with which it meshes will differentially position the sleeve 158. The gear 159 attached to one end of the sleeve 158 will drive a gear 1591 and through the bell-cranks 160 (Fig. 6) and 161 (Fig. 11) will position the gear 162 so as to differentially adjust the transaction type carrier 163 associated with the check printing mechanism. The sleeve 270 (Fig. 15) which is connected to and movable with the gear 156 will, through its gear 271 (Fig. 19) bell-crank 272 and gear 273 (Figs. 4 and 9) differentially position the transaction type carrier 274 which is associated with the record strip printing mechanism.

If the transaction entered in the machine is one in which it is desired to disable the selected clerk's totalizer the pin 354 (Fig. 5) of that key engaging the slot 355 in the cam plate 356 will actuate the shaft 358 thereby drawing downwardly all the links 360 and since there will be at this time only one bell-crank 349—350 which has not been moved from its normal position this particular one will be rocked so that the cam slot 344 will draw rearwardly the totalizer engaging slide 346 which has previously been moved forwardly to effect engagement of the pinions of the associated totalizer with the operating gears. The result of this construction is that the selected totalizer will be disabled from operation. When the cam plate 355 was moved rearwardly the lug 3553 (Fig. 5) was moved away from the plate 3551 and when the cam 356 is returned to normal by the restoration of the operated transaction key the lug 3553 will contact and rest against the edge 3555 of the plate 3551 thereby holding the cam plate 356 in its moved position. This will permit the transaction throwout mechanism to be effective during a series of item entering operations.

When the shaft 36 is partially rotated the cam 293 (Fig. 19) acting upon the bell-crank 291 will rock it clockwise and by its connection to the stud 290 of the record strip sub-totalizer frame 266 will engage the totalizer pinions with the operating gears 268 (Fig. 4).

Attention is called to the fact that when the shaft 36 is partially rotated the cam 128 (Fig. 7A) acting upon the bell-crank 127 will move the link 126 (Fig. 7) rearwardly thereby engaging the totalizer pinions of the sub-totalizer 122 with the operating gears 75 which are also at this time stationary.

At this point in the operation of the machine it will be noted that besides having engaged the pinions of the totalizers 266 and 122 with their respective actuating gears the desired clerk's totalizer will have been moved to a position in which it may be operated by its operating gears in case the transaction entered is one in which it is desired to actuate the clerk's totalizer, but in the event that the transaction is one in which it is desired to have the selected clerk's totalizer disabled the proper transaction key will have effected this.

Since the key coupler 32 is held in its partially elevated position the desired amount keys may be initially depressed so as to latch them to the key coupler by means of the latch plates 33 (Fig. 6) which slide into the notches 42 formed in each of the keys. In this manner the desired amount keys corresponding to the first item, which in the example assumed, will be the "8"

key of the tens bank and the "5" key of the pennies bank, may be attached to the coupler, it being noted that when the arms 43 of the operated amount keys (Fig. 7) are initially depressed the rollers 44 carried thereby will not effect any movement of the associated cam plates 47 since the rollers 44 will work in dwells 73 formed in each of the cam plates. However, the lower end of each key will depress the related bail 72 and disengage the hook 71 from the forward extension 70 of one of the key cams associated with that group of keys thereby unlocking the differential frame and maintaining it unlocked since the amount key will be held in its latched position.

As the amount keys which are latched to the key coupler are operated further the associated differential frames will actuate the segments 54 and 50 for the pennies and dimes banks respectively, so as to differentially move the racks 51 and 55 which are respectively geared to the segments 50 and 54. The racks 51 and 55 (Fig. 4) will, through the gears 2670 differentially position the gears 268 thereby differentially actuating the pinions attached to the sub-totalizer elements 269 while simultaneously the gears 335 meshing with the racks and connected by sleeves to the gears 333 will differentially operate the totalizer elements associated with the selected clerk's totalizer. In the same manner the operating gears 75 which are driven from the racks by means of gears 74 and connecting sleeves will differentially actuate the sub-totalizer elements associated with the sub-totalizer 122.

Since the gears 75 are in continuous mesh with pinions attached to the item type wheels 76 (Fig. 4) the latter will be adjusted differentially so as to print the item entered upon the check strip. As the shaft 36 is rotated the cam 97 (Fig. 8) will rock the bell-crank 95 against the tension of spring 99 until the cam passes out of engagement with the roller 96 carried by the bell-crank whereupon the spring 99 will snap the bell-crank forward so that the engagement of its upper end with the stud 98 carried by the item type hammer 87 will cause the latter to be thrown upwardly against the adjusted type carriers to effect a printing impression upon the check strip.

At a certain point in the first item entering operation of a series involved in a transaction the pin 112 (Fig. 7) contacting with the latch 106 will disengage the latter from the cross member 102 so that the spring 105 will force the roller 103 into contact with the co-operating feeding wheels or rollers 108, and when the feeding rollers are in co-operative relationship with each other after the printing impression has been taken upon the check strip an increment of movement will be given to the roller 103 by reciprocation of the feeding pawl 114 (Fig. 8) co-acting with the ratchet wheel 113.

After a printing impression has been taken the inking ribbon 88 will be given an increment of movement by means of a feeding pawl 117 (Figs. 8 and 10) engaging the ratchet wheel 116, since the arm 118 which carries the feeding pawl 117 is connected by the link 119 to the arm 115 which carries the feeding pawl 114. Attention is directed to the fact that during the first item entering operation the cam 169 (Fig. 6) co-operating with the roller 168 will rock the bell-crank 167 counter-clockwise whereupon the latch pawl 171 will engage a stud 172 so that the bell-crank 167 will be held in a slightly rocked rearward position against the tension of spring 178 and will permit the hammers 164 and 165 to drop downwardly away from the printing type carriers, the studs 166 at this time remaining in contact with the upper arm of the bell-crank 167. At this time it will be noted that the arm 174 secured to shaft 170 will be in proximity to the pin 176 carried by the check lever 177.

It will also be observed in Fig. 7 that when the feeding roller 103 is in co-operative relationship with the associated feeding rollers 108 the pin 452 carried by the extension 191 will engage the notch 450 formed in the extension of the member 254 thereby locking the control lever in the position in which it was placed prior to the first item entering operation, and preventing any movement of the control lever out of its adjusted position during the successive item entering operations constituting a single transaction.

During the continued operation of the operating keys the racks 51 and 55 will be differentially adjusted as explained and will then be returned to their normal positions. Before the racks are returned to normal, however, the selected clerk's totalizers and the sub-totalizers 122 and 266 are drawn out of co-operative relationship with their operating gears so that the amount entered in the different totalizing devices may be left thereon. The remaining items of a transaction may be entered in the machine in the same manner as the initial item although it will not be necessary to depress either the clerk's or transaction keys again since their differential frames will have remained set.

In the event that an amount should be added to one of the totalizer elements which requires the wheel to pass through the zero point the transfer mechanism will be effective to add a unit to the next higher order wheel. When the shaft 36 is rotated the cam 366 (Fig. 2) acting upon the roller 365 will rock the curved arm 364 so that the segment 368 will be rocked first counter-clockwise then clockwise. This will result in rocking the shaft 370 and through the gear 371 (Fig. 5) connected to said shaft will reciprocate the transfer operating rack 372 to effect the necessary transfers.

When transfer mechanism of the type shown in Figs. 23 to 27 inclusive is utilized, and one of the totalizer wheels passes through the zero position the tripping projection 383 will, during the time it passes through the zero position engage one of the projections of the triangular disk 387 thereby rocking the transfer unit to the position shown in Fig. 24 at which time one of the projections of disk 386 will pass into the notch formed in the transfer operating disk 391 which is, at this time stationary. When the totalizer is disengaged from the operating pinions the shaft 373 will be rocked counter-clockwise by means of the rack 372 acting on the gear 375 which is intermediate the rack 372 and the gear 374 attached to the transfer operating shaft. Rocking of the shaft 373 counter-clockwise will rock the transfer disk 391 counter-clockwise. Since the shoulder 392 of the disk is in co-operative relation with a projection of disk 386 it will rotate the triangular disk clockwise, and since another point of the triangular disk 386 co-operates with the pinion of the next higher order wheel, this wheel will be advanced one step and after this has been effected the shaft 373 will be rocked reversely so that the disks 386 and 387 and other parts will assume the positions shown in Fig. 23.

When the embodiment shown in Figs. 30 to 33 is utilized the transfer tripping projection 405 will, by its engagement with one of the projections of the triangular disk 407, rock the transfer member clockwise from the position shown in Fig. 30 to the position shown in Fig. 31. During this operation one of the transfer points of the star wheel 408 will be brought over the shoulder 418 of the transfer disk 417 so that when the disk is operated it will rock the transfer member further clockwise and by reason of the fact that one of the transfer points 408 is in engagement with the pinion of the next higher order wheel it will advance the pinion and the totalizer wheel a unit after which the transfer shaft 403 is rocked reversely bringing the parts to the position shown in Fig. 30.

In this manner the items comprising the sale are successively entered in the machine, it being understood that since the clerk's and transaction differential mechanism have been locked in their differentially adjusted position during the first item entering operation, it will not be necessary to depress either of these keys when subsequent items comprising the same transaction are successively entered in the machine. When the last item is entered in the machine and it is desirable to obtain the total of such items and print the same upon a check strip which is issued thereafter, the sub-total lever 177 is drawn rearwardly and then returned to its normal position to effect various functions.

As will be observed in Fig. 6 when the amount keys are operated the periphery of the disk 203 co-acting with the lug 202 will lock the lever 177 against movement until the keys are restored to their normal position. When the keys are in such position the check lever 177 may be forced rearwardly so that the lug 202 passing in front of the portion 204 of the locking disk will lock the keys against operation.

When the check lever is forced rearwardly the segmental rack 186 (Fig. 6) will, through the gear 185 drive the shaft 107 and therefore the roller 180. Due to the fact that the lower portion 1800 of the roller is cut away there will be no feeding of the paper during the initial movement of the check lever and at this time the pin 176 contacting with the upper end of the arm 174 will rock the shaft 170 thereby disengaging the pawl 171 from the stud 172 and permitting the spring 178 connected to the bell-crank 167 to rock the upper arm of the bell-crank forwardly and by its engagement with the studs 166 the hammers 164 and 165 will both be thrown against the type carriers to take an impression upon the check strip which is at this time located beneath the type carriers. When the platen 165 is thus operated it will effect a printing impression from the consecutive numbering type carrier elements 132 (Fig. 11) thus indicating the number of checks that have been issued up to this time. When the platen 164 is operated it will effect a printing impression from the date printing elements 130 (Fig. 11) the amount printing elements 124 and 231, and the special type carriers 153 and 163 for denoting the clerk operating the machine and the type of transaction entered, respectively. The manner in which this printing impression appears upon the check strip is shown in Fig. 13 by the last line on the check. As the handle of the sub-total lever is swung farther rearwardly the segmental rack 186 will drive the shaft 107 (Fig. 6) still farther to give the feeding roller 180 a complete revolution thereby feeding the paper outwardly, and during this movement of the roller, the electros 182 and 1821 will print certain advertising matter illustrated in Fig. 13.

When the handle of the sub-total lever reaches its extreme rearward position the camming projection 192 (Fig. 7) formed on the segmental rack 186 will engage the pin 193 carried by the arm 101 thereby positively moving the yoke frame downwardly until it is latched in its lower inactive position. The downward movement of the extension 191 will permit the spring 1891 connected to the bell-crank 189 to force the roller 190 against the roller 79 so as to suitably hold the record strip to permit its being torn off without any danger of drawing the paper from the supply roll 78.

Simultaneously the pin 452 (Fig. 7) will be disengaged from the notch 450 thereby unlocking the control lever 250 and permitting its adjustment to the "Slip" position if so desired. When the sub-total lever reaches its extreme rearward movement it is again drawn forwardly to its normal position it being understood at this time that since the feeding rollers are separated it will permit the return movement of the lever without effecting any reverse movement of the check paper.

When the sub-total lever is moved rearwardly it will be remembered that the gear 185 is rotated and by the engagement of the projection 199 (Fig. 12) with the upper edge of the arm 198 the latter will be rocked counter-clockwise, and by the connecting spring 197 will rock the arm 196 and shaft 195 counter-clockwise. Through the arm 194 the bell-crank 135 will be rocked clockwise rocking the bail 134 and the feeding pawl 133 rearwardly. The movement of the pawl by its engagement with the ratchet teeth will add one to the consecutive numbering type carriers. At the extreme end of the return movement of the lever 177 the projection 199 will act upon the underside of the arm 198 so that the stud 2000 engaging the shoulder 201 of the arm 196 will positively rock the shaft 195 clockwise and through the train of mechanism just described will restore the bail 134 to its normal position. In this manner when the machine is conditioned for check printing a unit is added to the consecutive numbering counters each time that the sub-total lever is operated.

In the preceding description it has been assumed that the items and the total of the items, together with related information have been printed upon an issued check, but if it is desired to print the same information upon an inserted slip the control lever 250 is moved to the "Slip" position and the slip inserted in the slot 256 (Fig. 7) before the keys are operated. The items and total will be printed upon the slip in a manner similar to that described in connection with printing on the check strip, but it will be noted that when the control lever 250 is moved to the "Slip" position the teeth 252 formed on the lower end of the lever (Fig. 12) will, through the segmental rack 253 rock the shaft 151 clockwise and by means of the arm 254 (Fig. 7) engaging the stud 255 carried by the plate 80 of the check table it will shift the check strip forwardly. Since the leaf-spring 86 insures that the check paper moves with the check table, the end of the check strip is shifted from the severing point 179 to a position forward of a line joining the shafts 100 and 107, and hence out of the range of the rollers 103, 108 and 180. Therefore, it will be noted in this case while items are being printed on the inserted slip and when the sub-total lever is operated to print the totals there will be no feeding of the check paper.

When the check table is moved forwardly the hooked member 259 (Fig. 8) integral with the plate 80 will engage the stud 258 of the hammer 165 thereby lifting the hammer slightly and holding the stud 166 (Fig. 6) out of co-operative relationship with the upper arm of the operating bellcrank 167, so that the consecutive number hammer will not be operated when the sub-total lever is moved rearwardly. This action will prevent printing of consecutive numbers upon the inserted sales slip when the machine is conditioned for sales slip printing.

Attention is also directed to the fact that when the control lever is moved to the "Slip" position the pin 260 (Fig. 12) carried thereby will engage the notch 261 of the arm 196 thereby holding the arm stationary. When the sub-total lever 177 is given a rearward and then a return movement the operating arm 198 will be oscillated in the manner previously described, but since the arm 196 is rigidly held by the pin 260 the spring 197 cannot move the arm 196 to add a unit to the numbering type carriers and in this operation the spring 197 will merely be stretched and then permitted to return to its normal condition.

Besides having certain printing functions the sub-total lever 177 operates certain mechanism whereby the totalizer elements of the sub-totalizers 266 and 122 are restored to their normal positions so that these totalizers may again accumulate items comprising a subsequent sale, and the manner in which this and incidental functions are performed will now be described generally.

When the check lever is forced rearwardly the pin 176 (Fig. 7) working in the cam slot 207 will, through the arm 2082 move the link 210 downwardly and by means of the connecting arm 211 will rock the shaft 37. Rocking of the shaft 37 by means of the attached pins 230 contacting with the upper ends of the bails 72 will disengage the hooked members 71 from the projections 70 carried by one of the cam plates of each of the differential frames thereby unlocking all the amount differential frames and related actuators.

After the actuators have been unlocked the pin 241 (Fig. 7) will contact with the rearward end of the slot formed in the link 240 and through the arm 239 will rock the shaft 209 and by means of the arms 238 (Fig. 2) attached to the rod 209 will rock the rod 237 rearwardly and since this rod is in front of and engages the forward edges of the segmental racks 54, 50, 61, 68 and 236 (Fig. 18) it will move these racks rearwardly. Since each rack segment has a connection to its associated sliding rack 51, 55, 62, 69 and 235 all the sliding racks will be moved rearwardly as well as the connected operating gears (see Fig. 4) utilized for the purpose of differentially actuating the totalizer elements of the various totalizing devices. When the segmental racks are in their rearmost positions and are stationary, but while the lever 177 is still being moved a shouldered portion 242 (Fig. 7) formed on the rearward edge of the sub-total lever 177 will contact with the stud 243 and rock the bell-crank 127 counter-clockwise until the stud 244 carried thereby is caught by a spring-urged latching member 245. As a result of this the link 126 will draw the totalizer pinions of the sub-totalizer 122 into mesh with the operating gears 75 which are at this time stationary and are rotated to their "9" positions. Simultaneously the arm 322 which is rocked by the shaft 209 will, through the roller 323 (Fig. 19) striking the upper jaw of the member 324, rock it counter-clockwise and through the cam slot 326 engaging the pin 327 will rock the bell-crank 291 clockwise thereby engaging the totalizer pinions of the totalizer 266 with their associated operating gears 268. The pawl 3241 will hold the member 324 in its moved position retaining the totalizer in its moved position even though the roller 323 is subsequently drawn away from the upper jaw of the member 324. Therefore, at this point in the operation it will be noted that the various operating gears are all turned to their "9" positions and that the sub-totalizer pinions of the sub-totalizers 266 and 122 are meshed therewith so that upon the return movement of the sub-total lever the totalizer elements will be rotated to their zero positions.

When the sub-total lever 177 is returned to normal the rod 237 (Fig. 2) is also returned permitting the weight of the differential frames as well as the springs 246, one connected to each segmental rack, to drive the sliding transmitting racks forwardly and through the operating gears 75, 232 and 268 (Fig. 4) to reversely rotate the totalizer pinions and wheels of the sub-totalizers 122 and 266, respectively. In whatever position a totalizer element may have been standing at the time it has engaged with the associated operating pinion the related transmitting rack will be permitted to be moved forwardly a corresponding number of spaces and in this manner each totalizer pinion is reversely rotated to its zero position.

As will be noted in Fig. 23, if the transfer mechanism of the form shown in this figure is utilized, when each totalizer element is rotated in a clockwise direction the corresponding transfer tripping projection 383 will, at the end of the rotative movement of the totalizer wheel to zero position, come into contact with one of the points of the related triangular disk 387 which will tend to rotate the transfer member counter-clockwise, but since one of the points of the triangular disk 386 engages the outer concentric portion of the cam disk 391 which is, at this time stationary, it will prevent movement of the totalizer wheel past the zero position. The totalizer element of the highest order is stopped at its zero position by the engagement of the transfer tripping projection 383 with the projection 398 (Fig. 26).

Similarly when the transfer mechanism of the type shown in Fig. 30 is utilized the totalizer elements in this instance are stopped at their zero positions by the engagement of the transfer tripping projection 405 with one of the points of the triangular disk 407 while the highest order wheel is stopped at the zero position by the engagement of the transfer tripping projection 405 with the projection 424 (Fig. 33) of the irregularly shaped member 423.

At a certain point in the return movement of the sub-total lever 177 a pin 2461 (Fig. 7) carried by the arm 208 will contact with the forward extension 247 of the latching member 245 thereby disengaging the hooked portion of the latching member from the stud 244 and permitting the spring 248 connected to the link 126 to draw the totalizer pinions of the sub-totalizer 122 out of engagement with the operating gears 75 and 232 and since the actuating segments and racks are now unlocked the weight of the differential frames as well as the force of the springs 246 will, through the segmental racks 54, 60, 61, 68 and 236 drive the associated transmitting racks an extent of movement which is the complement of the amount subtracted from the totalizer devices at which time they will be at their normal positions.

Simultaneously, the arm 322 (Fig. 19) will be returned to its normal position and at a certain point in its movement the pin 323 will co-operate with the lower jaw of the member 324 and through the cam slot 326 reversely rock the bell-crank 291 and thus disengage the pinions of the sub-totalizer 266 from engagement with the operating gears 268. Therefore at this point in the operation of the machine the sub-totalizers 122 and 266 will have been reset so that they may again individually accumulate items pertaining to a subsequent sale.

As previously stated when the link 210 is moved downwardly it will, through the arm 211 rock the shaft 37 and through the arm 212 (Fig. 17) and the tripping member 213, will rock the drawer catch release lever 215 to release the hook 216 from the drawer catch 217 and permit the drawer to fly open under the influence of the drawer spring.

As will be observed in Fig. 8 when the sub-total lever 177 is returned to its normal position after having been moved rearwardly the pawl 222 (Fig. 8) will engage the tripping member 223 rocking the shaft 224 and the arms 225. The arms 225 through the cam slots 226 engaging the pins 227 will rock the latching bails 141 and 1561 (see also Fig. 5) downwardly thereby disengaging them from the projections carried by the cam plates which have previously been operated and when a complete disengagement is effected the differential frames will return to their normal positions thereby restoring the transaction and clerk's type carriers to their normal positions. Release of the transaction differential frame will also disengage the lug 3553 from the supporting edge 3555 of the plate 3551 permitting the cam plate 355 to be restored to its normal position.

When the rod 237 (Fig. 2) is moved rearwardly and upwardly in sub-totaling operations as previously described, its co-operation with the cam slot 299 will rock the bell-crank 298 clockwise and through the arm 297 will rock the shaft 296 to force the rubber impression block 295 against the sub-total, special character, and ledger type printing elements to effect a printing impression upon the record strip 300.

During the first, or clockwise movement of the shaft 209 (Fig. 19), the link 312 will, through the bell-crank 311 rock the triple armed member 310 so that the pawl 309 will slip idly over the teeth of the ratchet wheel 308. The member 310 will subsequently be rocked reversely and since the pawl 309 engages one of the teeth of the ratchet wheel 308 the ratchet wheel and roller will be given an increment of movement. After the sub-total has been printed the impression is immediately drawn into view so that if desired a written notation may also be made on the record strip, entries being made through the writing slot 320.

It will also be noted that the first movement of the triple armed member 310 will, through the bell-crank 318 give a step of movement to the ratchet wheel 316 and inking roller 315 so that a fresh portion of the ribbon may be presented to the type elements.

Whenever an operator desires to replenish the paper supply or insert a new inking ribbon or, if for any reason whatsoever it is desired to have access to the mechanisms located beneath the hinged cover 521 the latter is elevated. It will be noted that when the cover 521 is raised the stud 527 (Fig. 20) co-operating with the slot 528 will force the shield 522 forwardly so that an integral portion of the shield 522 instead of an opening, will now be located over each of the totalizers. At this time the totalizers will be covered so that it will not be possible to surreptitiously rotate the elements.

To print the totals from the clerk's totalizers upon the record strip the total printing lever 505 (Fig. 2) is moved first in one direction and then the other. In order to obtain the totals standing upon the clerk's totalizers "B" and "D" the total printing lever 505 (Fig. 2) is, in the present instance, moved rearwardly and by means of the forward portion of the cam slot 507 it will rock the stud 504 downwardly thereby rocking the inner platens 501 in the same direction to effect a printing impression from the totalizers "B" and "D" upon the record strip. To take a printing impression from totalizers "A" and "E" the total printing lever 505 is moved forwardly so that it will rock the outer platens downwardly thereby effecting a printing impression from the remaining totalizers "A" and "E" upon the record strip. In order to bring the total into view the paper retaining key 508 (Figs. 4 and 20) is rotated.

Whenever it is desired to reset the totalizer elements to zero the various resetting shafts 337 (Fig. 20) are unlocked by inserting the key in the lock 533 and by turning the key thus rocking the cam plate 534 counter-clockwise. This will result in moving the locking plate 532 forwardly disengaging the notches 531 from the reduced portions 530 of the resetting shafts and permitting the resetting knobs 515 to be rotated to reset the totalizer elements.

To reset the totalizer elements the desired resetting shaft 337 is moved laterally so as to bring the resetting pawls 516 (Fig. 26) into co-operative relationship with the notches 517 formed in the shaft 317. When the shaft is turned the abrupt wall of each notch will contact with the end of its related pawl and pick up the corresponding totalizer element in whatever position it may be standing so that continued rotation of the shaft will bring each totalizer wheel to its zero position.

While the form of mechanism herein described is admirably adapted to fulfill the objects primarily stated, it is to be understood that it is not intended to confine the invention to the one form of embodiment therein shown, since it may be embodied in various forms, all coming within the scope of the claims which follow.

What is claimed is:

1. In a machine of the class described, the combination with a plurality of item entering keys, of a differential mechanism under control of the keys, transmission mechanism controlled by the differential mechanism, a plurality of special keys, a plurality of totalizers, a differential mechanism under control of the special keys for controlling the establishment of co-operative relationship between a desired totalizer and the transmission mechanism, and means whereby the differential mechanism under control of the special keys is retained in its differentially moved position after being actuated by one of the special keys preceding a series of item entering operations.

2. In a machine of the class described, item entering mechanism including a plurality of item entering keys and actuating devices operated by the keys, a totalizer actuated by the actuating devices for totaling the series of items entered in the machine, total printing mechanism a manually operable device operable separately from the keys for printing the total standing upon the totalizer, and means controlled by the manually operable device for operating the actuating devices to clear the totalizer.

3. In a machine of the class described, the combination with a totalizer, of keys, actuating devices for said totalizer operated by the keys for entering items in the totalizer, a total lever, means operated thereby for taking an imprint, from the totalizer, of the total of the series of items entered thereon, and means operated by the total lever for operating the actuating devices to clear the totalizer.

4. In a machine of the class described, the combination with a totalizer comprising a plurality of movable elements, of keys, actuating devices controlled by the keys for entering a series of items in the totalizer, a manually operable device for printing the total of the series of items from the totalizer, and connections between the device and the actuating devices for operating the actuating devices to clear the totalizer.

5. In a machine of the class described, the combination with a totalizer comprising a plurality of movable elements, of keys, actuating devices positively operated by the keys for entering a series of items in the totalizer, and a manually operable device operable separately from the keys for printing the total of the series of items from the totalizer, and connections between the device and the actuating devices for operating the actuating devices to clear the totalizer.

6. In a machine of the class described, the combination with a totalizer comprising a plurality of movable elements, of keys, actuating devices controlled by the keys to enter items in the totalizer, a manually operable mechanism for printing the total from the totalizer and for operating the actuating devices so that they may clear the totalizer, mechanism for normally locking the actuating devices, and connections whereby either the keys or manually operable mechanism may disable the locking mechanism.

7. In a machine of the class described, the combination of a totalizer, of keys, type carriers, actuating devices directly operated by the keys for adjusting the type carriers to print a series of items and enter the items in the totalizer, means for alternately engaging and disengaging the totalizer and the actuating devices whereby the series of items are entered and retained in the totalizer, a manually operable mechanism operable separately from the keys for recording the total of the series of items, and means controlled by one element of the manually operable mechanism for operating the actuating devices to clear the totalizer.

8. In a machine of the class described, having a plurality of amount keys and actuating devices positively operated by the amount keys for adjusting type carriers whereby a series of items may be printed, the combination of a printing totalizer, means controlled by the actuating devices for entering the items in the totalizer, a platen adapted to be cocked, and means, operable separately from the operating keys for releasing the platen for printing, from the printing totalizer, the total of the series of items and operating the actuating devices to clear the totalizer.

9. In a machine of the key operated type having keys and devices actuated thereby for printing a series of items upon either an inserted slip or issued check, the combination of a totalizer actuated by the key actuated devices for registering the series of items, a platen adapted to be cocked, an operating device operable separately from the keys for recording the total of the items registered by the totalizer, means operated by the operating device for feeding the inserted slip or check out of the machine after a total recording operation, a control lever adapted to condition the machine for check or slip printing, and means whereby the control lever prevents feeding of the check by the operating device when the machine is conditioned for printing upon an inserted slip.

10. In a machine of the key operated type having keys and printing devices actuated thereby for printing items upon either an inserted slip or a check strip contained in the machine, the combination of a platen adapted to be cocked, mechanism operable separately from the keys for releasing the platen for printing the total of a series of items upon either the inserted slip or check strip, means for printing a consecutive number adjacent the printed total, a control lever for conditioning the machine for either check or slip printing, and means for preventing the printing of the consecutive number when the control lever conditions the machine for slip printing.

11. In a machine of the key operated type having key-actuated item entering means for printing a series of items entered in the machine upon different record mediums such as an inserted slip and check strip contained in the machine, the combination of a total recording mechanism for printing a total of the series of items upon either the inserted slip or the check strip, a control lever for determining on which printing medium the total will be printed, means for consecutively numbering the totals printed upon one record medium, and means for preventing the printing of the consecutive numbers when the control lever is adjusted to cause printing of the totals upon the other record medium.

12. In a machine of the key operated type having keys, key-actuated item entering means, and printing devices actuated by the keys for printing items upon either an inserted slip or on a check strip contained in the machine, the combination of a total recording mechanism for printing the total of a series of items upon either the inserted slip or check strip, a pair of feeding rollers for feeding the check or slip out of the machine after the total is recorded, a control lever for conditioning the machine for check or slip printing, and means controlled by the control lever for shifting the check strip to bring it out of co-operative relationship with the feeding rollers so that after a total is recorded on the inserted slip the check strip will not be fed out of the machine.

13. In a machine of the class described, the combination with keys, of key-actuated item entering means, a total recording mechanism including a printing totalizer actuated by the item entering means for accumulating a series of items entered by the keys, a platen co-operating with the printing totalizer for printing the totals accumulated by the totalizer on an inserted slip or issued check, and means actuated by the total recording mechanism for actuating the key-actuated item entering means to clear the totalizer.

14. In a machine of the class described, the combination with a plurality of keys, item entering means actuated by said keys, a total accumulating and recording device adapted to be actuated by the item entering means to accumulate the total of the series of items, a platen co-operating with the total recording device, an operating device for said platen, means operated by said keys to latch the platen operating device, and a manually operable device having connections to disable the latch whereby the platen effects a total printing impression upon the record strip from the total recording device.

15. In a machine of the key operated type having a series of keys and item printing devices under control of the keys adapted to print a series of items upon a record medium, the combination of a pair of feeding rollers adapted to space the record medium after each item printing operation, a total recording device adapted to record the total of the items printed, an electro roller mounted in axial alignment with one of said rollers, a total lever, means controlled by the total lever for effecting a printing impression from the total recording device on the record medium, and means controlled by the total lever for rotating the electro roller and one of said rollers to feed the record medium after a total printing impression.

16. In a machine of the class described, the combination with a series of keys, of item printing devices adapted to print a series of items on a record medium, a feeding roller mounted on a fixed pivot, a co-operating feeding roller carried by a frame, means for latching the frame to normally hold the feeding rollers apart, and means for disabling the latch and then rotating the roller carried by the frame to space the record medium after an item printing operation.

17. In a machine of the class described, the combination with a series of keys, of item printing devices adapted to be controlled by the keys for printing a series of items upon a record medium, a pair of feeding rollers co-operating with the record medium, means for latching one of the feeding rollers so that they are normally separated, and means for disabling the latch and then rotating the feeding rollers to space the record medium after an item printing operation.

18. In a machine of the class described, the combination with a series of keys, of item printing devices under control of the keys adapted to print a series of items upon a check strip, means, including a feeding roller, for spacing the check strip after each item printing operation, a check issuing lever, an electro roller, a segment operated by the check lever adapted to drive the electro roller, and means controlled by the check lever for separating the feeding and electro roller.

19. In a machine of the class described, the combination with a series of keys, of printing devices controlled by the keys adapted to print a series of items upon a check strip, a pair of idler rollers, a feeding roller co-operating with the idler rollers, means controlled by the keys for rotating the feed roller to space the check strip after each item printing operation, an electro roller, and a check issuing lever and connections therefrom whereby the check lever drives the electro roller and through the feeding roller issues the printed check out of the machine.

20. In a machine of the class described, the combination with a series of keys, of printing devices controlled by the keys adapted to print a series of items upon a check strip, a pair of idler rollers, a feeding roller co-operating with the idler rollers, means controlled by the keys for rotating the idler rollers and feed roller to space the check strip after each item printing operation, an electro roller, a check issuing lever and connections therefrom whereby the check lever drives the electro roller and through the feed roller issues the printed check out of the machine, and means whereby the check lever separates the electro and feeding rollers after the printed check has been issued out of the machine.

21. In a machine of the class described, the combination of a manually operable lever, a part oscillatable by said lever, a series of numbering elements, an operating mechanism for the numbering elements, comprising a plurality of connected members, and a projection carried by the part and adapted to engage opposite sides of one of the members of the operating mechanism whereby the latter is reciprocated to add a unit to the numbering elements during each operation of the lever.

22. In a machine of the class described, the combination of a series of consecutive number type carriers, an operating mechanism therefor whereby a unit is added to the type carriers, a manually operable lever, connections between the lever and the operating mechanism for actuating the latter, said connections including a spring, a platen for printing consecutive numbers, a control lever, and means actuated by the control lever for disabling the platen to prevent printing from the consecutive number type carriers and simultaneously rendering the spring ineffective as an actuating connection, whereby the operating mechanism is ineffective during operations of the lever to add a unit to the consecutive number type carriers.

23. In a machine of the class described, the combination of item entering devices, a total recording device, a platen co-operating with the total recording device, a series of consecutive numbering type carriers, a platen co-operating with the consecutive numbering type carriers, an operating means common to both platens, means controlled by the item entering devices for latching the platen operating means, a total lever, and means whereby the total lever disables said latch.

24. In a machine of the class described, the combination of a plurality of totalizers, totalizer selecting keys, actuating mechanism, slidably mounted plates for engaging the totalizers with the actuating mechanism, pivoted cam plates having cam slots engaging studs carried by the slidably mounted plates, and a differentially adjustable member under control of the totalizer selecting keys for imparting a rotary movement to all but one of the pivoted cam plates for preventing the engagement of all but the desired totalizer.

25. In a machine of the class described, the combination of a plurality of totalizers, a main operating mechanism, totalizer actuating mechanism, pivoted cam plates provided with slots, slidable totalizer engaging members provided with studs engaging said slots, means operated by the main operating mechanism for actuating the pivoted cam plates for operating the totalizer engaging members to engage the totalizers with the actuating mechanism, and a differentially adjustable member operable at the same time to prevent engagement of all but one of said totalizers.

26. In a machine of the class described, the combination of a plurality of totalizers, an operating mechanism, a plurality of totalizer selecting keys, a differential mechanism under control of the totalizer selecting keys, a plurality of totalizer engaging plates, connecting devices between the totalizer engaging plates and the operating mechanism, a plurality of cam disks co-operating with said connecting devices, and means controlled by the totalizer selecting key differential mechanism for adjusting the cam disks and through the connecting devices for rendering all but one of the associated totalizer engaging plates ineffective.

27. In a machine of the class described, the combination of a plurality of totalizers, a differential mechanism arranged to enter a series of items in a selected totalizer, a plurality of totalizer selecting keys, differential means under control of the totalizer selecting keys, a plurality of totalizer engaging plates, connecting devices between the totalizer engaging plates and the operating mechanism, a plurality of cam disks co-operating with said connecting devices, means controlled by the totalizer selecting key differential means for adjusting the cam disks and through the connecting devices for rendering all but one of the associated totalizer engaging plates ineffective, and means whereby the totalizer selecting key differential means will be retained in its differentially moved position during the time that a series of items are being entered in the same totalizer by the differential mechanism.

28. In a machine of the class described, the combination of a plurality of printing totalizers, a plurality of pairs of platens associated with the printing totalizers, a total printing lever co-operating with the platens and so arranged that when moved in one direction it will operate one pair of platens to effect printing from one pair of totalizers and when moved in the other direction will operate the remaining pair of platens to effect printing from the remaining pair of totalizers.

29. In a machine of the class described, the combination of a plurality of printing totalizers there being an inner pair and an outer pair, a plurality of pairs of platens co-ordinated with the totalizers, a total printing lever, and means to connect the platens to move in unison, said means being under control of the total lever when moved in one direction for moving one pair of platens against the inner pair of totalizers and when moved in the opposite direction for moving the remaining pair of platens against the outer pair of totalizers.

30. In a machine of the class described, the combination of two pairs of printing totalizers, two pairs of platens co-ordinated with the printing totalizers, connections between the two pairs of platens, a total printing lever co-operating with the connections and so arranged that when the lever moves one pair of platens against its related pair of totalizers the other pair of platens is being moved away from the related pair of totalizers.

31. In a machine of the class described, the combination of a plurality of pairs of printing totalizers, a corresponding number of platens mounted in pairs, platen holding devices each supporting and carrying a pair of platens, a pin and slot connection between the platen holding devices, and a total printing lever provided with a double acting cam slot engaging said pin.

32. In a machine of the class described, the combination of a plurality of pairs of printing totalizers, a corresponding number of pairs of platens, a total printing lever, connections between the pairs of platens, and a pin and slot coupling between the total printing lever and the connections whereby printing by the platens from the pairs of printing totalizers may be effected alternately.

33. In a machine of the key operated type having keys and printing devices actuated thereby for printing items upon either an inserted slip or on a check strip contained in the machine, the combination of a platen, means for cocking the platen, mechanism operable separately from the keys for releasing the platen for printing the total of a series of items upon either the inserted slip or check strip, means controlled by said mechanism for feeding the inserted slip or check strip out of the machine, and a control lever for selectively conditioning the machine for either check or slip printing and determining the operative engagement of the feed mechanism with either a check or a slip.

34. In a machine of the key operated type having keys and printing devices actuated thereby for printing items upon either an inserted slip or on a check strip contained in the machine, the combination of a platen, means for cocking the platen, mechanism operable separately from the keys for releasing the platen for printing the total of a series of items upon either an inserted slip or check strip, means controlled by said mechanism for feeding the inserted slip or check strip out of the machine, a control lever for conditioning the machine for either check or slip printing, and means whereby movement of the control lever to the slip position will cause the check strip to be shifted to prevent its being fed out of the machine by said mechanism during slip feeding operations.

35. In a machine of the key operated type having keys and printing devices actuated thereby for printing items upon either an inserted slip or a check strip contained in the machine, the combination of a platen, means for cocking the platen, mechanism operable separately from the keys for releasing the platen for printing the total of a series of items upon either an inserted slip or check strip, a series of consecutive numbering type carriers, means controlled by said mechanism for adding a unit to the consecutive numbering type carriers each time that said mechanism is operated, means for printing the consecutive numbers upon the checks, a control lever for conditioning the machine for either check or slip printing, and means whereby the control lever prevents the addition of a unit to the consecutive numbering type carriers and printing therefrom whenever said control lever conditions the machine for slip printing operations.

36. In a machine of the key operated type having means for printing a series of items and a separate means for printing the totals thereof upon either an inserted slip or issued check, together with an operating means for each, the combination of means controlled by one of the operating means for causing the printing of consecutive numbers, an adjustable control lever for conditioning the machine for check or slip printing, and means whereby adjustment of the control lever to a certain position prevents printing of the consecutive numbers.

37. In a machine of the key operated type having a series of keys and item printing devices under control of the keys for printing items upon a record medium, the combination of a pair of feeding rollers adapted to cooperate with the record medium, latching means for normally holding the rollers apart, means actuated by the keys for disabling the latching means, means for subsequently rotating the feeding rollers to space the record medium after an item printing operation, a manually operable device, an electro roller cooperating with one of the feeding rollers, and means operated by the manually operable device for driving the electro roller and said one of the feeding rollers to feed the record medium a greater distance than that during an item printing operation.

38. In a machine of the class described, the combination with a series of keys, of item printing devices adapted to print a series of items on a record medium, a feeding roller mounted on a fixed pivot, a cooperating feeding roller carried by a frame, means for latching the frame to normally hold the feeding rollers apart, means for disabling the latch, and means for rotating the roller carried by the frame to space the record medium after an item printing operation.

39. In a machine of the class described, the combination with a series of keys, of item printing devices adapted to print a series of items on a record medium, a feeding roller mounted on a fixed pivot, a cooperating feeding roller carried by a frame, means for latching the frame to normally hold the feeding rollers apart, means for disabling the latch, means for rotating the roller carried by the frame to space the record medium after an item printing operation, and a common drive for the two last named means.

FREDERICK L. FULLER.

CERTIFICATE OF CORRECTION.

Patent No. 2,041,752.　　　　　　　　　　　　　　　May 26, 1936.

FREDERICK L. FULLER.

It is hereby certified that error appears in the printed specification of the above numbered patent requiring correction as follows; Page 1, first column, line 52, for the word "tool" read total; page 11, second column, line 66, after "clerk's" insert or; page 12, first column, line 42, for the numeral "266" read 261; page 17, first column, line 6, for "start" read star; page 24, second column, line 5, claim 9, after "for" insert the words releasing the platen for; and that the said Letters Patent should be read with these corrections therein that the same may conform to the record of the case in the Patent Office.

Signed and sealed this 4th day of August, A. D. 1936.

Henry Van Arsdale (Seal)　　　　　　　　　　　　　　　　　　　Acting Commissioner of Patents.